United States Patent
Yazami et al.

(10) Patent No.: US 9,196,426 B2
(45) Date of Patent: Nov. 24, 2015

(54) ELECTRODES INCORPORATING NANOSTRUCTURED POLYMER FILMS FOR ELECTROCHEMICAL ION STORAGE

(75) Inventors: Rachid Yazami, Singapore (SG); Cedric M. Weiss, Pasadena, CA (US); Richard Kaner, Pacific Palisades, CA (US); Julio D'Arcy, Los Angeles, CA (US)

(73) Assignees: California Institute of Technology, Pasadena, CA (US); The Regents of the University of California, Oakland, CA (US); Centre National De La Recherche Scientifique, Paris (FR)

( * ) Notice: Subject to any disclaimer, the term of this patent is extended or adjusted under 35 U.S.C. 154(b) by 891 days.

(21) Appl. No.: 12/968,146

(22) Filed: Dec. 14, 2010

(65) Prior Publication Data

US 2011/0229759 A1 Sep. 22, 2011

Related U.S. Application Data

(60) Provisional application No. 61/286,101, filed on Dec. 14, 2009.

(51) Int. Cl.
*H01M 4/60* (2006.01)
*H01G 11/48* (2013.01)
(Continued)

(52) U.S. Cl.
CPC ............... *H01G 11/48* (2013.01); *H01G 11/24* (2013.01); *H01M 4/0402* (2013.01); *H01M 4/137* (2013.01); *H01M 4/1399* (2013.01);
(Continued)

(58) Field of Classification Search
CPC . H01G 11/24; H01G 11/48; H01M 2004/022; H01M 4/0402; H01M 4/137; H01M 4/1399; H01M 4/366; H01M 4/60; H01M 4/602; H01M 4/66; Y02E 60/122; Y02E 60/13
USPC .................. 429/213; 361/500, 502, 503, 523; 427/79; 977/762, 788, 948
See application file for complete search history.

(56) References Cited

U.S. PATENT DOCUMENTS

| 4,204,216 A | 5/1980 | Heeger et al. |
| 4,222,903 A | 9/1980 | Heeger et al. |

(Continued)

FOREIGN PATENT DOCUMENTS

| KR | 1019990051074 | 7/1999 |
| KR | 1020010017407 | 3/2001 |
| KR | 1020060123535 | 12/2006 |

OTHER PUBLICATIONS

Nanotechnology. (n.d.). Collins English Dictionary—Complete & Unabridged 10th Edition. Retrieved Feb. 10, 2014, from Dictionary.com website: http://dictionary.reference.com/browse/nanotechnology.*

(Continued)

*Primary Examiner* — Milton I Cano
*Assistant Examiner* — Ling R Zeng
(74) *Attorney, Agent, or Firm* — KPPB LLP

(57) ABSTRACT

Ion storage electrodes formed by coating an underlying substrate with a nanofibrillar film of structured conjugate polymer nanofibers and methods of forming such electrodes are described herein. The electrical properties of the electrodes may be customized by modifying the structure of the polymer nanofibers, the thickness of the nanofiber film, and the pore size of the nanofiber films.

16 Claims, 11 Drawing Sheets

(51) Int. Cl.
*H01M 4/04* (2006.01)
*H01M 4/137* (2010.01)
*H01M 4/1399* (2010.01)
*H01M 4/36* (2006.01)
*H01M 4/66* (2006.01)
*H01G 11/24* (2013.01)
*H01M 4/02* (2006.01)

(52) U.S. Cl.
CPC ............. *H01M4/366* (2013.01); *H01M 4/60* (2013.01); *H01M 4/602* (2013.01); *H01M 4/66* (2013.01); *H01M 2004/022* (2013.01); *Y02E 60/122* (2013.01); *Y02E 60/13* (2013.01)

(56) References Cited

U.S. PATENT DOCUMENTS

| | | | |
|---|---|---|---|
| 4,321,114 | A | 3/1982 | Macdiarmid et al. |
| 4,801,512 | A * | 1/1989 | MacDiarmid et al. ........ 429/213 |
| 2003/0217928 | A1 * | 11/2003 | Lin et al. ........................ 205/109 |

OTHER PUBLICATIONS

International Search Report and Written Opinion for International Application PCT/US2010/060347; report completed Sep. 27, 2011, 6 pgs.
Aleshin, "Polymer nanofibers and Nanotubes: Charge Transport and Device Appllctions", Adv. Mater. 2006. vol. 18, pp. 17-27.
Alici et al., "Response Characterization of Electroactive Polymers as Mechanical Sensors", IEEE/ASME Transactions on Mechatronics, Apr. 2008, vol. 13, No. 2, pp. 187-196.
Ata, "Coalescence of Bubbles Covered by Particles", Langmuir, 2008, vol. 24, pp. 6085-6091.
Baker et al., "Monolithic Actuators from Flash-Welded Polyaniline Nanofibers", Adv. Mater., 2008, vol. 20, pp. 155-158.
Berdichevsky et al., "Poypyrrole Nanowire Actuators", Adv. Mater., 2006, vol. 18, pp. 122-125.
Binks et al., "Growth of Gold Nanoparticle Films Driven by the Coalescence of Particle-Stagilized Emulsion Drops", Langmuir, 2006, vol. 22, pp. 4100-4103.
Binks et al., "Particle film growth driven by foam bubble coalescence", Chem. Commun., 2006, pp. 3531-3533.
Blois et al., "Electron Spin Resonance Studies on Melanin", Biophysical Journal, 1964, vol. 4, pp. 471-490.
Bolto et al., "Electronic Conduction in Polymers", Aust. J. Chem. 1963, vol. 16, pp. 1190-1103.
Bravo-Grimaldo et al., "Metastable Reaction Mixtures for the in Situ Polymerization of conducting Polymers", Macromolecules, 2007, vol. 40, pp. 7166-7170.
Burroughes et al., "Light-Emitting Diodes based on conjugated polymers", Nature, Oct. 11, 1990, vol. 347, pp. 539-541.
Cattena et al., "Crucial role of decoherence for electronic transport in molecular wires: Polyaniline as a case study", Physical Review, 2010, vol. B 82, pp. 144201-1-144201-10.
Cheng et al., "Film climbing of particle-laden interfaces", Colloids and Surfaces A/ Physicochem. Eng. Aspects, 2008, vol. 315, pp. 275-284.
Chengara et al., "Spreading of nanofluids driven by the structural disjoining pressure gradient", Journal of Colloid and Interface Science, 2004, vol. 280, pp. 192-201.
Chiou et al., "Polyaniline Nanofibers Prepared by Dilue Polymerization", Adv. Mater. 2005, vol. 17, pp. 1679-1683.
Chiou etal., "A Simple Approach to Control the Growth of Polyaniline Nanofibers", Synthetic Metals, 2005, 153, pp. 69-72.
Cho et al., "Electrchemical Synthesis and Fast Electrochromics of Poly(3,4-ethylendeioxythiophene) Nanotubes in Flexible Substrate", Chem. Mater., 2005, vol. 17, pp. 4564-4566.
Cho et al., "Fast Electrochemistry of Conductive Polymer Nanotubes: Synthesis, Mechanism, and Application", Accounts of Chemical Research, Jun. 3, 2008, vol. 41, No. 6, pp. 699-707.

Cho et al., "Nanotube-Based Ultrafast Electrochromic Display", Adv. Mater., 2005, vol. 17, No. 2, pp. 171-175.
Choi et al., "Electrochemistry of Conductive Polymers, XXVI. Effects of Electrolytes and Growth Methods on Polyaniline Morphology", Journal of the Electrochemical Society, 2002, vol. 149, No. 2, pp. E26-E34.
D'Arcy et al., "Versatile solution for growing thin films of conducting polymers", PNAS, Nov. 16, 2010, vol. 107, No. 46, pp. 19673-19678.
De Surville et al., "Ellectrochemical Chains Using Protolytic Organic Semiconductors", Electrochimica Acta, 1968, vol. 13, pp. 1451-1458.
Desai et al., "Electrospinning Nanofibers of PANI/PMMA Blends", Mat. Res. Soc. Symp. Proc, 2003, vol. 736, pp. D2.7.1-D2.7.6.
Desai et al., "Phase Characterization and Morphology Control of Electrospun Nanofibers of PANT/PMMA Blends", Mat. Res. Soc. Symp. Proc., 2004, vol. 788, pp. 209-214.
Diaz et al., "Electroactive Polyaniline Films", J. Electroanal. Chem, 1980, vol. 111, pp. 111-114.
Gallon et al., "Palladium Nanoparticles Supported on Polyaniline Nanofibers as a Semi-Heterogeneous Catalyst in Water", Angew. Chem. Int. Ed. 2007, vol. 46, pp. 7251-7254.
Guo et al., "Light-Controlled Organic/Inorganic P-N Junction Nanowires", J. Am. Chem. Soc., 2008, vol. 130, pp. 9198-9199.
He et al., "Conductance of polymer nanowires fabricated by a combined electrodeposition and mechanical break junction method", Applied Physics Letters, Feb. 5, 2001, vol. 78, No. 6, pp. 811-813.
Heeger et al., "Solitons in conducting polymers", Reviews of Modern Physics, Jul. 1988, vol. 60, No. 3, pp. 781-851.
Huang et al., "A General Chemical Route to Polyaniline Nanofibers", J. Am. Chem. Soc., 2004, vol. 126, pp. 851-855.
Huang et al., "Nanofiber Formation in the Chemical Polymerization of Aniline: A Mechanistic Study", Angew. Chem. Int. Ed., 2004, vol. 43, pp. 5817-5821.
Huang et al., "Polyaniline nanowires by electropolymerization from liquid crystalline phases", J. Mater. Chem., 2002, vol. 12, pp. 388-391.
Huang et al., "The intrinsic nanofibrillar morphology of polyaniline", Chem. Commun., 2006, pp. 367-376.
Huang etal., "Polyaniline Nanofibers: Facile Synthesis and Chemical Sensors", J. Am. Chem. Soc., 2003, vol. 125, pp. 314-315.
Hush, "An Overview of the First Halff-Century of Molecular Electronics", Ann. N.Y. Acad. Sciente, 2003, vol. 1006, pp. 1-20.
Inzelt, "Conducting Polymers: A New Era in Electrochemistry", Springer, 2008, pp. 265-267.
Jing et al., "Sonochemical synthesis of polyaniline nanofibers", Ultrasonics Sonochemistry, 2007, vol. 14, pp. 75-80.
Kinlen et al., "Emulson Polymerization Process for Organically Soluble and Electrically Conducting Polyaniline", Macromolecules, 1998, vol. 31, pp. 1735-1744.
Langer et al., "Polyaniline nano-wires and nano-networks", synthetic Metals, 2001, vol. 121, pp. 1281-1282.
Lee et al., "Highly Aligned Ultrahigh Density Arrays of Conducting Polymer Nanorods Using Block Copolymer Templates", Nano Letters, 2008, vol. 8, No. 8, pp. 2315-2320.
Li et al., "Oligomer-Assisted Synthesis of Chiral Polyaniline Nanofibers", J. Am. Chem. Soc., 2004, vol. 126, pp. 2278-2279.
Li et al., "Polyaniline Nanofibers: A Unique Polymer Nanostructure for Versatile Applications", Accounts of Chemical Research, Jan. 2009, vol. 42, No. 1, pp. 135-145.
Li et al., "Synthesis of Dendritic Polyaniline Nanofibers in a Surfactant Gel", Macromolecules, 2004, vol. 37, pp. 2683-2685.
Liang et al., "Direct Assembly of Large Arrays of Oriented Conducting Polymer Nanowires", Angew. Chem. Int. Ed., 2002, vol. 41, No. 19, pp. 3365-3368.
Liu et al., "MnO2/Poly(3,4-ethylenedioxythiophene) Coaxial Nanowires by One-Step Coelectrodeposition for Eletrochemical Energy Storage", J. Am. Chem. Soc., 2008, vol. 130, pp. 2942-2943.
Liu et al., "Polymeric Nanowire Chemical Sensor", Nano Letters, 2004, vol. 4, No. 4, pp. 671-675.
Liu et al., "Templateless Assembly of Molecularly Aligned Conductie Polymer Nanowires: A New Approach for Oriented Nanostructures", Chem. Eur. J., 2003, vol. 9, No. 3, pp. 604-611.

(56) References Cited

OTHER PUBLICATIONS

Lucassen et al., "Capillary Engineering for Zero Gravity. Critical Wetting on Axisymmetric Solid Surfaces", Langmuir, 1992, vol. 8, pp. 3093-3098.
Ma et al., "Polyaniline Nanowires of Si Surfaces Fabricated with DNA Templates", J. Am. Chem. Soc., 2004 vol. 126, pp. 7097-7101.
Macdiarmid et al., "Electrostatically-generated nanofibers of electronic polymers", Synthetic Metals, 2001, vol. 119, pp. 27-30.
Majewski et al, "Extended storage time of poly(3-hexylthiophene) field0effect transistors via immersion in common solvents", Journal of Applied Physics, 2007, vol. 102, pp. 074515-1-074515-4.
Martin, "Template Synthesis of Electronically Conductive Polymer Nanostructures", Acc. Chem. Res. 1995, vol. 28, pp. 61-68.
Mayya et al., "A New Technique for the Spontaneous Growth of Colloidal Nanoparticle Superlattices", Langmuir, 1999, vol. 15, pp. 1902-1904.
McGinness, "Mobility Gaps: A Mechanism for Band Gaps in Melanins", Science, 1972, vol. 177, No. 52, pp. 896-897.
McGinness et al., "Amorphous Semiconductor Switching in Melanins", Science, 1974, vol. 183, pp. 853-855.
Melle et al., "Pickering Emulsions with Controllable Stability", Langmuir, 2005, vol. 21, pp. 2158-2162.
Michaelson et al., "Interfacial Polymerization of Aniline", J. Chem. Soc., Chem Commun., 1994, pp. 79-80.
Nicolaus et al., "The Nature of Animal Blacks", Atti Accademia Potaniana, N.S vol. XLIV, pp. 197-233.
Nicolaus et al., "The Structure of Melanins annd Melanogenesis—IV", Tetrahedron, 1964, vol. 20, pp. 1163-1172.
Niu et al., "Biological Templated Synthesis of Water-Soluble Conductive Polymeric Nanowires", Nano Letters, 2007, vol. 7, No. 12, pp. 3729-3733.
Oyama et al., "Dimercaptan-polyaniline composite electrodes for lithium batteries with high energy density", Nature, Feb. 16, 1995, vol. 373, pp. 598-600.
Pan et al., "Synthesis of Polyaniline Nanotubes with a Reactive Template of Manganese Oxide", Adv. Mater., 2007, vol. 19, pp. 461-464.
Park et al., "Enhancement of Field-Effect Mobility and Stability of Poly(30hexylthiophene) Field-Effect Transistors by Conformation Change", J. Phys. Chem. C,, 2008, vol. 112, pp. 1705-1710.
Peng et al., "Conducting polymers for electrochemical DNA sensing", Biomaterlals, 2009, vol. 30, pp. 2132-2148.
Pillalamarri et al., Radiolytic Synthesis of Polyaniline Nanofibers: A New Templateless Pathway, Chem. Mater., 2005, vol. 17, 227-229.
Pinto et al., "Electrospun polyaniline/polyethylene oxide nanofiber field-effect transistor", Applied Physics Letter, Nov. 17, 2003, vol. 83, No. 20, pp. 4244-4246.
Ramanathan et al., "Individually Addressable Conducting Polymer Nanowires Array", Nano Letters, 2004, vol. 4, No. 7, pp. 1234-1239.
Rey, "Stability Analysis of Catenoidal Shaped Liquid Crystalline Polymer Networks", Macromolecules, 1997, vol. 30, pp. 7582-7587.
Sariciftci et al., "Photoinduced Electron Transfer from a conducting Polymer to Buckminsterfullerene", Science, Nov. 27, 1992, vol. 258, pp. 1474-1476.
Scavia et al., "Effect of the silanizaiton and annealing on the morphology of thin poly(3-hexylthiophene) (P3HT) layer on silicon oxide", Surface Science, 2008, vol. 602, pp. 3106-3115.
Shao et al., "DNA-templated assembly and electropolymerization of aniline on gold surface", Electrochemistry Communications, 2002, vol. 4, pp. 773-779.
Spinks et al., "Carbon-Nanobute-Reinforced Polyaniline Fibers for High-Strength Artificial Muscles", Adv. Mater., 2006, vol. 18, pp. 637-640.
Tran et al, "Toward an Understanding of the Formation of Conducting Polymer Nanofibers", Am. Chem. Soc., 2008, vol. 2, No. 9, pp. 1841-1848.
Tran et al., "One-Dimensional Conducting Polymer Nanostructures: Bulk Synthesis and Applications", Adv. Mater., 2009, vol. 21, pp. 1487-1499.
Tseng et al., "Polyaniline Nanofiber/Gold Nanoparticle Nonvolatile Memory", Nano Letters, 2005, vol. 5, No. 6, pp. 1077-1080.
Virji et al., "Polyaniline Nanofiber Gas Sensors: Examination of Response Mechanisms", Nano Letters, 2004, vol. 4, No. 3, pp. 491-496.
Wan, "Conducting Polymer Nanotubes", Encyclopedia of Nanoscience and Nanotechnology, 2004, vol. 2, pp. 153-169.
Wang et al., "Ordered Whiskerlike Polyaniline Grown on the Surface of Mesoporous Carbon and Its Electrochemical Capacitance Performance", Adv. Mater. 2006, vol. 18, pp. 2619-2623.
Wei et al., "Formation Mechanism of Self-Assembled Polyaniline Micro/Nanotubes", Langmuir, 2002, vol. 18, pp. 917-921.
Wei et al., "Synthesis and Characterization of Self-Doped Poly(aniline-co-aminonaphthalene sulfonic acid) Nanotubes", Journal of Applied Polymer Science, 2003, vol. 87, No. 1297-1301.
Wu et al., "Conducting Polyaniline Filaments in a Mesoporous Channel Host", Science, Jun. 17, 2994, vol. 264, pp. 1757-1759.
Wu et al., "Fast trilayer polypyrrole bending actuators for high speed applications", Synthetic Metals, 2006, vol. 156, pp. 1017-1022.
Xiao et al., "Controlled Electrochemical Synthesis of Conductive Polymer Nanotube Structures", J. Am. Chem. Soc., 2007, vol. 129, pp. 4483-4489.
Xu et al., "Nanoscale Surface Patterning of Enzyme-Catalyzed Polymeric Conducting Wires", Adv. Mater. 2004, vol. 16, No. 7, pp. 628-633.
Yu et al., "Preparation of Aqueous Polyaniline Dispersions by Micellar-Aided Polymerization", J. Appl. Polym. Sci., 2003, pp. 1550-1555.
Yun et al., "Nanowire Growth for Sensor Arrays", Proceedings of SPIE, 2003, vol. 5220, pp. 37-45.
Zhang et al., "Bulk Synthesis of Polypyrrole Nanofibers by a Seeding Approach", J. Am. Chem. Soc., 2004, vol. 126, pp. 12714-12715.
Zhang et al., "Chemical synthesis of PEDOT nanofibers", Chem. Commun., 2005, pp. 5328-5330.
Zhang et al., "Narrow Pore-Diameter Polypyrrole Nanotubes", J. Am. Chem. Soc., 2005, vol. 127, pp. 14156-14157.
Zhang et al., "Polyaniline nanofibers: chemical synthesis using surfactants", Chem. Commun., 2005, pp. 2360-2361.
Zhang et al., "Synthesis of Polyaniline Nanofibers by "Nanofiber Seeding"", J. Am Chem. Soc., 2004, vol. 126, pp. 4502-4503.
International Search Report for International Application PCT/US2010/060347; report completed Sep. 27, 2011, 3 pgs.
Written Opinion for International Application PCT/US2010/060347; completed Sep. 27, 2011, 3 pgs.
International Preliminary Report on Patentability for International Application No. PCT/US2010/060347, Report issued Jun. 19, 2012, Mailed Jun. 28, 2012, 4 Pgs.
Hadziioannou, Georges et al., Semiconducting Polymers, Chemistry, Physics and Engineering, Wiley-VCH, 1999, 25 pages.

\* cited by examiner

HCl (~30 nm)   CSA (~50 nm)   HClO₄ (~120 nm)

ELECTRODES INCORPORATING NANOSTRUCTURED POLYMER FILMS FOR ELECTROCHEMICAL ION STORAGE

CROSS-REFERENCE TO RELATED APPLICATIONS

The current application claims priority to U.S. Provisional. Application No. 61/286,101, filed, Dec. 14, 2009, the disclosure of which is incorporated herein by reference.

FIELD OF THE INVENTION

The present invention relates generally to electrode structures for electrochemical ion storage and methods of making such electrodes, and more specifically to electrodes that incorporate nanostructured conducting polymer films.

BACKGROUND OF THE INVENTION

Conductive polymers, or more precisely intrinsically conducting polymers (ICPs), are organic polymers that conduct electricity. Such compounds may have metallic conductivity or be semiconductors. The biggest advantage of conductive polymers is their processability. As conductive polymers are also plastics, they can combine the mechanical properties (flexibility, toughness, malleability, etc.) of plastics with high electrical conductivity. Moreover, the properties of these materials can be fine-tuned using conventional organic synthesis techniques. (See, e.g., György Inzelt, *Conducting Polymers A New Era in Electrochemistry*. Springer. pp. 265-269 (2008), the disclosure of which is incorporated herein by reference.)

In traditional polymers, such as polyethylenes, the valence electrons are bound in spa hybridized covalent bonds. Such "sigma-bonding electrons" have low mobility and do not contribute to the electrical conductivity of the material. The situation is completely different in conjugated polymer materials. Conducting or conjugated polymers have backbones of contiguous $sp^2$ hybridized carbon centers. One valence electron on each center resides in a $p_z$ orbital, which is orthogonal to the other three sigma-bonds. The electrons in these delocalized orbitals have high mobility when the material is "doped" by oxidation, which removes some of these delocalized electrons. Thus these conjugated polymer systems form a one-dimensional electron band structure, and the electrons within this band become mobile when it is partially emptied. In addition, these same materials can be doped by reduction, which adds electrons to an otherwise unfilled band. Although typically "doping" conductive polymers involves oxidizing or reducing the material conductive organic polymers associated with a protic solvent may also be "self-doped."

The most notable difference between conductive polymers and inorganic semiconductors is the electron mobility, which until very recently was dramatically lower in conductive polymers than their inorganic counterparts. The fundamental low charge carrier mobility is related to the inherent structural disorder of these materials. In fact, as with inorganic amorphous semiconductors, conduction in such relatively disordered materials is mostly a function of mobility gaps with phonon-assisted hopping, polaron-assisted tunneling, etc., between localized states. And, more recently, it has been reported that quantum decoherence on localized electron states might be the fundamental mechanism behind electron transport in conductive polymers. (See, e.g., McGinness, John E., *Science* 177 (52): 896-897 (1972), the disclosure of which is incorporated herein by reference.)

Conjugated polymers in their undoped, pristine state are semiconductors or insulators. As such, the energy gap can be >2 eV, which is too great for thermally activated conduction. Therefore, undoped conjugated polymers, such as polythiophenes and polyacetylene only have a low electrical conductivity of around $10^{-10}$ to $10^{-8}$ S/cm. However, even at a very low level of doping (<1%), electrical conductivity increases several orders of magnitude up to values of around 0.1 S/cm. Subsequent doping of the conducting polymers typically results in a saturation of the conductivity at values around 0.1-10 kS/cm for different polymers. The highest values reported up to now are for the conductivity of stretch oriented polyacetylene with confirmed values of about 80 kS/cm. (See, e.g., Cattena, Carlos J., et al., *Physical Review B*82 (14): 144201 (2010); Heeger, A. J., et al., *Reviews of Modern Physics* 60: 781 (1988); Heeger, A. J., Handbook of Organic Conductive Molecules and Polymers; Vol. 1-4, edited by H. S, Nalwa (John Wiley & Sons Ltd., Chichester, 1997); Handbook of Conducting Polymers; Vol. 1,2, edited by T. A. Skotheim, R. L. Elsenbaumer, and J. R. Reynolds (Marcel. Dekker, Inc., New York, 1998); Semiconducting Polymers; Vol., edited by G. Hadziioannou and P. F. v. Hutten (Wiley-VCH, Weinheim, 2007); and Burroughes, J. H., et al., *Nature* 347: 539 (1990); and Sariciftci, N. S., et al., *Science* 258 (5087): 1474 (1992), the disclosures of which are incorporated herein by reference.)

Conducting polymers show various promising applications, such as in transistors, sensors, memories, actuators/artificial muscles, supercapacitors, and lithium ionic batteries. (See, e.g., Aleshin, A. N., *Adv. Mater.*, 2006, 18, 17-27; Virji, S. et al., *Nano Lett.*, 2004, 4, 491-496; Huang, J. X. et al., *J. Am. Chem. Soc.*, 2003, 125, 314-315; Alici, G. et al., *IEEE-ASME Trans. Mechatron.*, 2008, 13, 187-196; Hui, P. et al., *Biomaterials*, 2009, 30, 2132-2148; Tseng, R. J. et al., *Nano Lett.*, 2005, 5, 1077-1080; Baker, C. O. et al., *Adv. Mater.*, 2008, 20, 155-158; Spinks, G. M. et al., *Adv. Mater.*, 2006, 18, 637-640; Wu, Y. et al., *Synth. Met.*, 2006, 156, 1017-1022; Wang, Y. G. et al., *Adv. Mater.*, 2006, 18, 2619-2623; and Oyama, N. et al., *Nature*, 1995, 373, 598-600, the disclosures of each of which are incorporated herein by reference.) Despite the promise presented by these materials, a number of challenges exist to their broad adoption and use in electrochemical devices. One challenge is usually the low solubility of these polymers. In addition, conductive polymers enjoy few large-scale applications due to their poor processability, the manufacturing costs associated with the material, material inconsistencies, toxicity, poor solubility in solvents, and inability to directly melt process. In fact, the poor processability for many polymers requires the introduction of solubilizing substituents, which can further complicate their synthesis. (See, e.g., Hush, Noel. S., *Annals of the New York Academy of Sciences*, 1006:1 (2003); B A Bolto, et al., Australian Journal of Chemistry, 16(6) 1090, (1963); De Surville, R. et al., *Electrochimica Acta*, 13: 1451 (1968); Diaz, A; Logan, J., *Journal of Electroanalytical Chemistry*, 111: 111 (1980); Blois, M. et al., *Biophysical Journal*, 4: 471 (1964); Nicolaus, R. et al., *Tetrahedron*, 20 (5): 1163 (1964); and Nicolaus, R. A. and Parisi, G., Atti Accademia Pontaniana XLIX, 197-233 (2000); and McGinness, J. et al., *Science*, 183 (127): 853-5 (1974), the disclosures of each of which are incorporated herein by reference.)

Many of these problems are being addressed through the formation of nanostructures and surfactant stabilized conducting polymer dispersions in water, including nanofibers and PEDOT:PSS. These nanofiber conducting polymers are rapidly gaining attraction in new applications because they are highly processable materials with better electrical and physical properties. (See, e.g., Tran, H D, et al., *ACS NANO*, 2008, 2(9), 1841-1848; Tran, H D, et al., *Adv. Mater.*, 2009, 21, 1487-1499; and Li, D, et al., *Accts. Chem. Res.*, 2009, 42(1), 135-145, the disclosures of each of which are incorporated herein by reference.) However, despite the promise offered by these conjugate polymer nanofibers, thus far no practical electrochemical devices have been developed using these materials.

Accordingly, a need exists for improved electrodes formed from conductive polymer structures capable of being used for ion storage in electrochemical devices.

SUMMARY OF THE INVENTION

The present invention is directed to electrode structures for use in the storage of ions made with novel nanostructured polymer films.

In one embodiment, the electrode structures in accordance with the invention include a substrate having a nanofibrillar film with a thickness of at least one monolayer disposed thereon. The film itself is formed from a plurality of doped amphoteric conjugate polymer nanofibers. In one such embodiment, the polymer nanofibers have a diameter of from 1 to 100 nm and a length of from 2 to 30 μm, and the film of nanofibers is substantially free from polymer aggregates. In another such embodiment, the film has a pore size sufficient to allow a dopant access to the nanofibers of the film, such as, for example, a micropores size range in the electrode of from 0.2 nm to 20 nm.

In another embodiment, the polymer nanofibers are selected from the group consisting of aromatic cycle polymers, double bond polymers, and polymers that include both aromatic cycles and double bonds. In one such embodiment the polymer nanofibers are, more particularly, selected from the group consisting of polyfluorenes, polypyrenes, polyazulenes, polynaphthalenes, polypyrroles, polycarbazoles, polyindoles, polyazepines, polyanilines, polythiophenes, poly(p-phenylene sulfides), polyacetylenes, poly(p-phenylene vinylenes) and polyparaphenylene. In another such embodiment, the polymers are self-doped or pre-doped, such as, by chemical doping or ion impantation doping. In another such embodiment, any of these polymers may be modified by one of the following techniques, such as, for example, by particles irradiation, X-ray, gamma, neutron and electron irradiation.

In still another embodiment, the film comprises multilayers of conjugate polymer nanofibers.

In yet another embodiment, the substrate is selected form the group consisting of a metal, a conductive glass, a carbon material, or a non-conducting material, and more particularly is selected from the group consisting of paper, gold, copper, titanium, nickel, platinum, tantalum, carbon, aluminum, stainless steel, plastic, Pyrex, and silica.

In still yet another embodiment, the nanofibers are made in accordance with a process selected from the group consisting insoluble hard templates, soluble soft templates, self-assembly external, nanowire seeding, and templateless processes.

In still yet another embodiment, the nanofibers are doped with an anionic dopant selected from the group consisting of $I^-$, $Br^-$, $Cl^-$, $F^-$, $ClO_4^-$, $PF_6^-$, $AsF_6^-$, $AsF_4^-$, $SO_3CF_3^-$, $BF_4^-$, $BCl_4^-$, $NO_3^-$, $POF_4^-$, $CN^-$, $SiF_5^-$, $CH_3CO_2^-$, $C_6H_5CO_2^-$, $CH_3C_6H_4SO_3^-$, $C_{10}H_{15}SO_4^-$, $SiF_6^{--}$, and $SO_4^{--}$.

In still yet another embodiment, the nanofibers are doped with a cationic dopant selected from the group consisting of Cs, Rb, K, Na, Ba, Li, Sr, Ca, Mg, Y, Sc, Be, Al, Zr, Ti, and organic cations. In one such embodiment, the organic cations are selected from the group consisting of tetraalkyl ammonium, tetraalkyl phosphonium, tetraalkyl arsonium, trialkyl oxonium, and trialkyl sulfonium.

In still yet another embodiment, the film is deposited on the substrate by a Marangoni flow technique.

In still yet another embodiment, the invention is directed to an electrochemical device incorporated at least one ion storage electrode in accordance with the invention. In one such embodiment, the device is selected from the group consisting of a flexible battery, a rigid battery, a capacitor and a super capacitor.

In still yet another embodiment, the invention is directed to a method of forming an ion storage electrode comprising. In one such embodiment the method includes the following steps:
  providing a substrate;
  providing a solution of conjugate polymer nanofibers, wherein the polymer nanofibers have a diameter of from 1 to 100 nm and a length of from 2 to 30 μm;
  depositing at least a one monolayer film of the nanofibers onto said substrate by a Marangoni flow technique such that the film has a nanofibrillar morphology and is substantially free from nanofiber aggregates; and
  doping said film with an electrochemical dopant.

In still yet another embodiment, the method further includes modifying the pH of the solution to improve the wetability of the substrate. In one such embodiment, the pH is modified between a range of 1 and 11 pH.

BRIEF DESCRIPTION OF THE DRAWINGS

These and other features and advantages of the present invention will be better understood by reference to the following detailed description when considered in conjunction with the accompanying drawings and data, wherein.

DETAILED DESCRIPTION OF THE INVENTION

Figure 1:
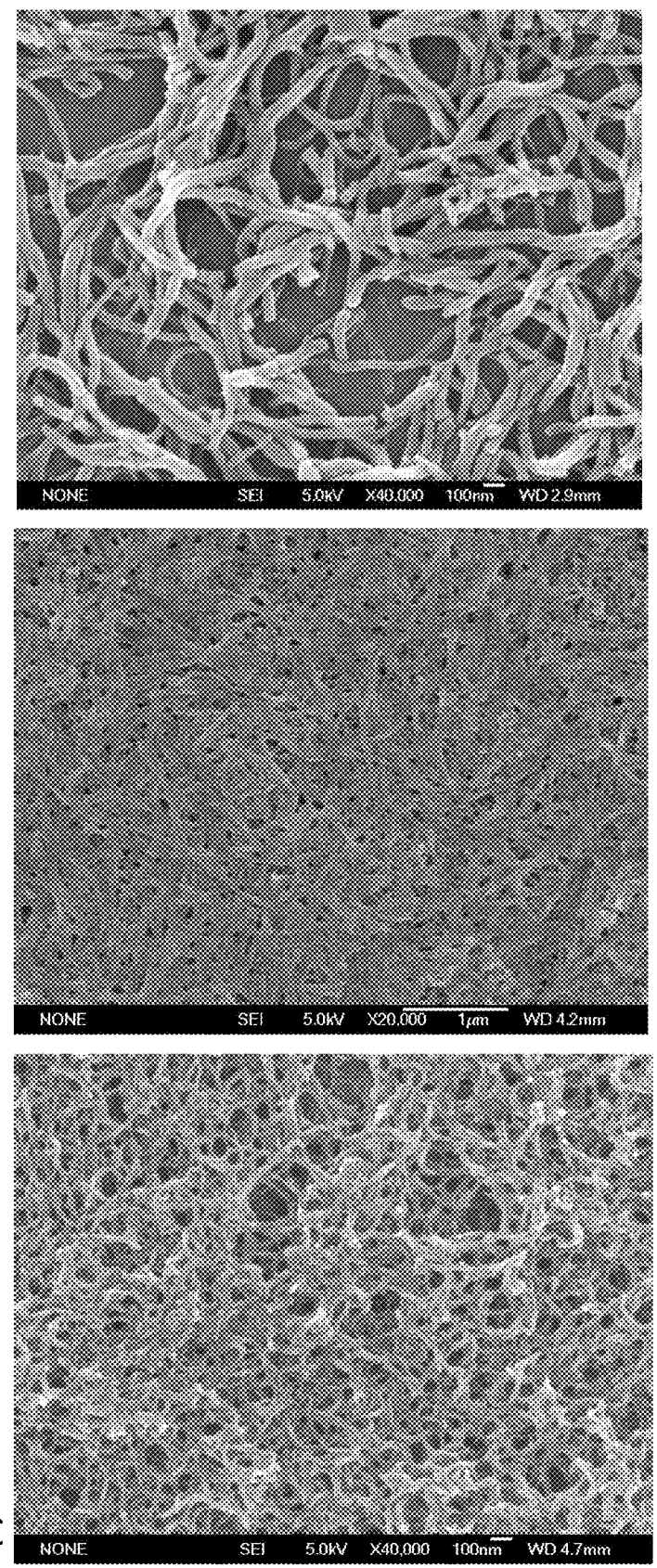
FIG. 1 provides SEM images of three exemplary conjugate nanofiber materials in accordance with the current invention including: polyaniline (A), polythiophene (B), and polypyrrole (C)

The current invention is directed to electrode structures for use in the storage of ions. The invention takes advantage of a new class of nanofiber conjugate polymer materials to form amphoteric electrodes that demonstrate improved cycling properties and remarkable application flexibility.

DEFINITIONS

The term "conjugate" or "conductive" polymer as used herein means a polymer having a π electron network that allows for electron transfer substantially throughout its molecular structure.

A polymer "composite" as used herein means an structural admixture of two or more polymeric materials or a polymeric material and a non-polymeric material that may or may not be covalently bound to one another.

A "nanofiber" as used herein is a one-dimensional. (1-D) nanostructure formed of a conjugate polymer having a diameter between 1 and 100 nm, a length of from 2 to 30 μm, such that the nanofibers possess a high aspect ratio.

A "film" as used herein is at least a monolayer of conductive polymer nanofibers having a nanofibrillar morphology that is substantially free of aggregates, and having a pore size of from 0.2 to 20 nm.

A "pore" as used herein is the spacing between polymer nanofibers.

Structured Conjugate Polymer Nanofibers

As described above, and shown schematically in FIG. 1, the electrodes of the instant invention are formed by coating an underlying substrate with a film of structured conjugate polymer nanofibers such that the material is able to accommodate a concentration of ions by intercalation, bonding, diffusion, etc. As will be discussed in greater detail later, although many different polymer nanofibers, substrates, and ion dopants may be used with the electrodes of the current invention, the operation of the electrode of the current invention as an effective ion storage vehicle is dependent on the structure of the polymer nanofiber used, the thickness of the nanofiber film, and the pore size of the nanofiber films. However, before discussing the structure and function of the nanofibers and nanofiber films used in the current invention, the electrochemical properties of conducting polymers in general will be described.

Conducting polymers are unique photonic and electronic functional materials owing to their high n-conjugated length, unusual conducting mechanism, and reversible redox doping/de-doping process. One chief advantage of these materials is that they are amphoteric, and can serve as either cationic or an anionic materials with both p-type and n-type electrical conductivities. In these systems a p-type material is obtained by oxidizing the polymer with an electron acceptor dopant, and an n-type material is obtained by reducing the polymer with an electron donor dopant. The resulting room temperature electrical conductivity of the doped conductive polymer increases with increasing degree of doping up to a certain point at which the maximum conductivity is obtained for any given dopant.

This doping scheme may be understood in accordance with the following generic redox equations:

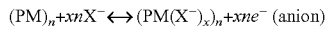

$(PM)_n + xnX^- \leftrightarrow (PM(X^-)_x)_n + xne^-$ (anion)

$(PM)_n + xnX^+ + xne^- \leftrightarrow (PM(X^+)_x)$ (cation)

where PM is a polymer monomer, X is the dopant ion, and x and n are quantitative numbers for the monomers, ions and electrons. For example, in one embodiment, a polyaniline polymer is used (FIG. 1A), in which case the redox equations would take the following form:

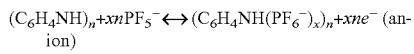

$(C_6H_4NH)_n + xnPF_5^- \leftrightarrow (C_6H_4NH(PF_6^-)_x)_n + xne^-$ (anion)

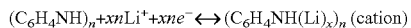

$(C_6H_4NH)_n + xnLi^+ + xne^- \leftrightarrow (C_6H_4NH(Li)_x)_n$ (cation)

Although the redox equations for a polyaniline conjugate polymer with a $LiPF_6$ electrolyte are shown above, it should be understood that, for the purposes of this invention, any suitable conductive or conjugated polymer capable of being formed into a structured nanofiber may be used with any suitable electrolyte material. Exemplary conjugate polymers that may be used with the electrodes of the current invention include, aromatic cycle polymers, such as, for example, polyfluorenes, polypyrenes, polyazulenes, polynaphthalenes, polypyrroles, polycarbazoles, polyindoles, polyazepines, polyanilines, polythiophenes, polyparaphenylenes, andpoly (p-phenylene sulfides); double bond polymers, such as, for example, polyacetylenes; and polymers that include both aromatic cycles and double bonds, such as, for example, poly(p-phenylene vinylenes). FIG. 1 provides SEMs of three exemplary conjugate polymer nanofibers that may be used in accordance with the current invention, including, polyaniline (FIG. 1A), polythiophene (FIG. 1B), and polypyrrole (FIG. 1c).

Figure 2:
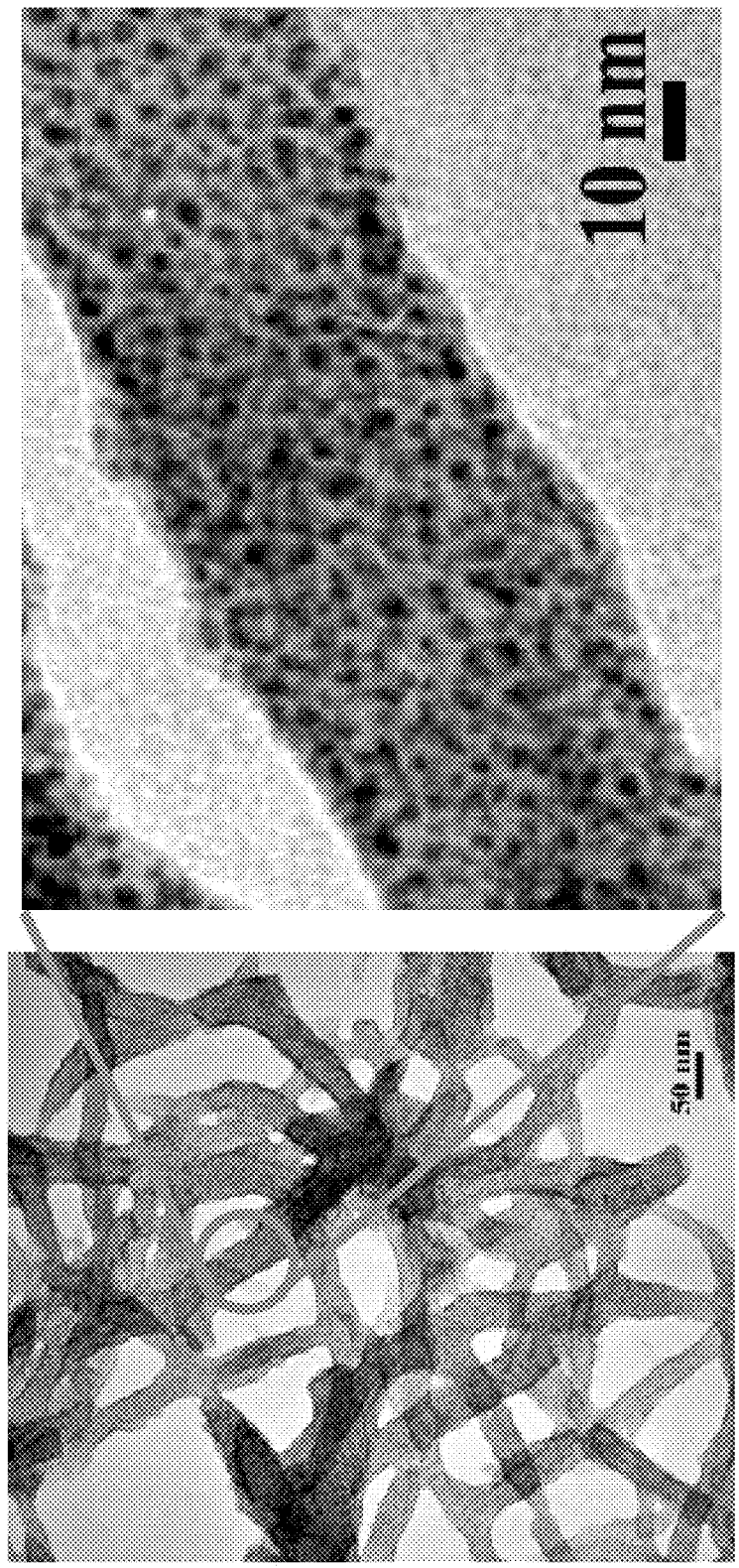
FIG. 2 provides an SEM of a composite polyaniline nanofiber with 1 nm Au particles.

In addition, these nanofibers can incorporate composite materials such as mixtures of polymers and metal or ceramic nanoparticles. For example, the SEMs provided in FIG. 2 show ~1 nm gold particles disposed on the polyaniline nanofibers. (See, Gallon, B. J. et al., *Angew. Chem., Int. Ed.* 2007, 46, 7251-7254, the disclosure of which is incorporated herein by reference.) The polymers can also be modified by techniques known to improve ion storage performances, such as, for example, particles irradiation, including X-ray, gamma, neutron and electron irradiation.

Regardless of the specific conjugate polymer chosen for use in the current invention they are formed into nanofibers suitable for coating onto the desired substrate. The nanofibers used should have a diameter of from 1 to 100 nm (preferably 50 nm), and a length of from 2 to 30 μm, and films formed from these nanofibers should have a nanofibrillar morphology in which the formation of agglomerated structures is minimized. In addition, it is important that the pore size of the film be selected such that the chosen electrolyte dopant may diffuse within the film to access as large a volume of the polymer nanofibers as possible, such as, for example between 2 to 20 nm.

Using these nanofibers in the electrode materials of the instant application overcomes problems, including poor charge transfer owing to the large path length and poor cycle life as the result of the strain from ion inclusion, that arise in conventional conductive polymer materials. In particular, although not to be bound by theory, the use of conducting nanofiber polymers addresses these issues by allowing for:

(i) higher electrode/electrolyte contact area leading to higher charge/discharge rates;
(ii) short path lengths for electronic transport (permitting operation with low electronic conductivity or at higher power);
(iii) short path lengths for the transport of ions; and
(iv) better accommodation of the strain of the electrochemical reaction to improve cycle life.

Any method suitable for forming nanofibers with these properties from the conjugate polymers set forth above may be used including, for example, insoluble hard templates such as zeolites, soluble soft templates, such as surfactants or bulky dopant acids, external agents to self assemble into micelles that can orchestrate the growth of 1-D nanostructures, methods that exploit the pre-existing nanoscale morphology of an additive such as nanowire seeding or the use of biotemplates, and templateless processes that exploit the nanofibrillar morphology intrinsic to these polymers when the polymer is formed in an aqueous media.

More specifically, at a single strand level, temptated polymerization in lithographically-defined nanochannels or on single strands of DNA, mechanical stretching, and dip-pen writing or drawing. (See, K. Ramanathan, et al., *Nano Lett.*, 2004, 4, 1237-1239; M. Yun, et al., *Proc. SPIE-Int. Soc. Opt. Eng.*, 2003, 5220, 37-45; Y. Ma, et al., *J. Am. Chem. Soc.*, 2004, 725, 7097-7101; H. X. He, et al., *Appl. Phys. Lett.*, 2001, 78, 811-813; P. Xu and D. L. Kaplan, *Adv. Mater,* 2004, 16, 628-633; H. Liu, et al., *Nano Lett.*, 2004, 4, 671-675, the disclosures of which are incorporated herein by reference.)

The capability of making polyaniline nanofibers individually at desired positions is needed to fabricate single nanofiber-based functional devices. For "film" scare, polyaniline nanostructures can be made by confined polymerization within the voids in nanoporous membranes or channels in zeolites, and by controlled electrochemical polymerization by electrospinning on conductive substrates. (See, C. R. Martin, *Acc. Chem. Res.*, 1995, 28, 61-68; C. G. Wu and T. Bein, *Science,* 1994, 254, 1757-1759, S. J. Choi and S. M. Park, *J. Electrochem, Soc.*, 2002, 149, J. Liu, et al., *Chem.-Eur. J.*, 2003, 9, 605-611; L. Liang, et al., *Chem., Int. Ed,* 2002, 41, 3665-3668; A. G. MacDiarmid, et al., *Synth. Met.*, 2001, 119, 27-30; K. Desai and C. Sung, *Mater. Res. Soc. Symp. Proc.*, 2002, 736, 121-126, K. Desai and C. Sung, *Mater. Res, Soc. Symp. Proc.*, 2003, 788, 209-214; and N. J. Pinto, et al., *Appl. Phys. Lett.*, 2003, 83, 4244-4246, the disclosures of each of which are incorporated herein by reference.)

For bulk synthesis of nanostructured polyaniline "nonstructural directing agents" may be introduced during the chemical polymerization of aniline. These agents may include surfactants, liquid crystals, polyelectrolytes, nanowire seeds, aniline oligomers and comptex, butky dopants. (See, e.g., J. C. Michaelson and A. J. McEvoy, *J. Chem. Soc., Chem. Commun.*, 1994, 79-80; L. Yu, et al., *J. Appl. Polym, Sci.*, 2003, 88, 1550-1555; G. Li and Z. Zhang, *Macromolecules,* 2004, 37, 2683-2685; X. Zhang and S. K. Manohar, *Chem. Commun.*, 2004, 20, 2360-2361; L M. Huang, et al., *J. Mater. Chem.*, 2002, 12, 388-391; J. M. Liu and S. C. Yang, *J. Chem. Soc., Chem. Commun.*, 1991, 1529-1531; Y. Shao, Y. Jin and S. Dong, *Electrochem. Commun.*, 2002, 4, 773-779; X. Zhang, et al., *J. Am. Chem. Soc.*, 2004, 126, 4502-4503; W. G. Li and H. L. Wang, *J. Am. Chem. Soc.*, 2004, 126, 2278-2279; M. X. Wan, in Encyclopedia of Nanoscience and Nanotechnology, ed. H. S, Nalwa, American Scientific Publishers, Los Angeles 2004, vol. 2, pp. 153-169; Z. X. Wei, Z. M. Zhang and M. X. Wan, *Langmuir,* 2002, 18, 917-921; P. J. Kinlen, et al., *Macromolecules,* 1998, 17, 1735-1744; Z. X. Wei and M. X. Wan, *J. Appl. Polym. Sci.*, 2003, 87, 1297-1301; J. J. Langer, G. Framski and R. Joachimiak, *Synth. Met,* 2001, 121, 1281-1282; and H. J. Qiu, et al., *Macromolecules,* 2001, 34, 675-677, the disclosures of each of which are incorporated herein by reference. These functional molecules can either directly act as templates polyelectrolytes) or promote the self assembly of ordered "soft templates" (e.g., micelles, emulsions) that guide the formation of polyaniline nanostructures.

Alternatively, an intrinsic nanofibrillar morphology technique may be used. (See, J. X. Huang, et al., *J. Am. Chem., Soc.*, 2003, 125, 314-315; J. X. Huang and R. B. Kaner, *Angew Chem., Int. Ed,* 2004, 43, 5817-5821; and J. X. Huang and R. B. Kaner, *Am. Chem. Soc.*, 2004, 126, 851-855, the disclosures of each of which are incorporated herein by reference.) in this technique, in contrast to previous work, in which great effort was made to "shape" the polymer into nanostructures, the technique takes advantage of intrinsic nanofibrillar morphological units in the conjugate polymer and focuses on modifying the reaction conditions so that nanofiber formation is favored, white overgrowth, that would otherwise Lead to irregularity-shaped agglomerates, is suppressed. Other "templateless" techniques that produce nanofibers include polymerization of aniline, rapid mixing of monomer and oxidant, and sonochemical and radiolytic assisted syntheses. (See, e.g., Chiou, N. R. and Epstein, A. J., *Adv. Mater.* 2005, 17, 1679-1683; Chiou, N. R. and Epstein, A. J., *Synth. Met.* 2005, 153, 69-72; Huang, J. X. and Kaner, R. B., *Angew. Chem., Int. Ed* 2004, 43, 5817-5821; Jing, X. L., et al., *Ultrason. Sonochem.* 2007, 14, 75-80; and Pillalamarri, S. K. et al., *Chem. Mater.* 2005, 17, 227-229, the disclosure of each of which are incorporated herein by reference.) A specific embodiment of such a "templateless" method for forming polyaniline nanofibers is described in detail in the Examples below.

Figure 3:
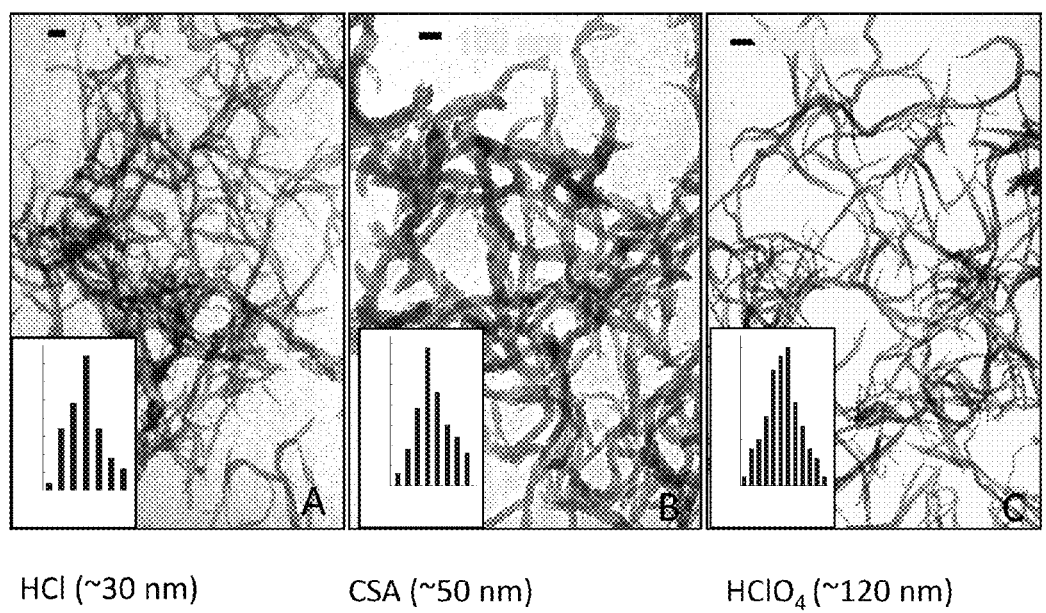
FIG. 3 provides SEM images and inset datagraphs showing size distributions for polyaniline nanofibers in HCL (A), CSA (B), and $HCLO_4$.

Preferably, the technique is chosen such that the length, diameter and cross-linking of the nanofibers can be engineered. For example, for polyaniline fibers, it has been shown that modifying solvent, dopant and polymerization temperatures and growth conditions allows for the minute control of the shape, size, density and deposition of polyaniline nanofibers. (See, e.g., J. X. Huang and R. Kaner, Chem. Commun., 2006, 367-376, the disclosure of which is incorporated herein by reference.) For example, FIG. 3 shows the change in nanofiber dimension that can be effected by using three different solvents during growth: HCL (A), CSA (B), and $HClO_4$. Similar techniques have been described and used with other polymers and may be incorporated into the current invention as well. (Bravo-Grimaldo E, et al., *Macromolecules* 2007, 40:7166-7170; Park Y D, et al., *J. Phys. Chem. C.* 2008, 112:1705-1710; Scavia G, et al., *Surf Sci.* 2008, 602:3106-3115; and Majewski L A and Song A M, *J. Appl. Phys.* 2007, 102:074515, the disclosures of which are incorporated herein by reference.)

As described above, in accordance with the electrochemical doping procedures of the present invention, p-type doping of the conjugated polymer is effected with anionic dopant species, while n-type doping of the polymer is effected with cationic dopant species. A wide variety of anionic and cationic dopant species may suitably be employed, either individually or in combination, for effectively modifying the room temperature electrical conductivity of the conjugated polymer in accordance with the present invention. Alternatively, the polymers may be "self-doped" or pre-doped, such as, for example, by chemical doping or by ion implantation for example.

Suitable anionic dopant species for effecting p-type doping include, for example, $I^-$, $Br^-$, $Cl^-$, $F^-$, $ClO_4^-$, $PF_6^-$, $AsF_6^-$, $AsF_4^-$, $SO_3CF_3^-$, $BF_4^-$, $BCl_4^-$, $NO_3^-$, $POF_4^-$, $CN^-$, $C_{10}H_{15}SO_4^-$, $SiF_5^-$, $CH_3CO_2^-$ (acetate), $C_6H_5CO_2^-$ (benzoate), $CH_3C_6H_4SO_3^-$ (tosylate), $SiF_6^-$, $SO_4^-$, or the like.

One class of cationic dopant species particularly suitable for effecting n-type doping are metallic cations of a metal whose Pauling electronegativity value is no greater than 1.6, such as, the alkali metals, all of the alkaline earth metals, and certain of the metals from Group 3 and Group 4 of the Periodic Table, including for example Cs, Rb, K, Na, Ba, Li, Sr, Ca, Mg, Y, Sc, Be, Al, Zr, and Ti. Another class of cationic dopant species particularly suitable for effecting n-type doping are organic cations selected from the group consisting of $R_{4-x}MH_x^+$ and $R_3E^+$, wherein R is alkyl. (e.g., up to about 20 carbon atoms), aryl. (e.g., phenyl, halophenyl, or alkylphenyl), or combinations thereof; M is N, P or As; E is O or S; and x is an integer ranging from 0 to 4. In such organic cations having more than one R group, the various R groups may be the same or different. Such organic cations which are particularly suitable are those wherein R is a $C_1$ to $C_{10}$ alkyl group, and x is 0, i.e., tetraalkyl ammonium, tetraalkyl phosphonium, tetraalkyl arsonium, trialkyl oxonium, and trialkyl sulfonium cations.

Any compound which is ionizable into one or more of the above-described ionic dopant species may be employed as the active material of the electrolyte of the electrochemical cell in carrying out the electrochemical doping procedures in accordance with the present invention, and thereby serves as the dopant ion source. Such ionizable compound may suitably be a simple salt of one of the cationic species of dopant ions with one of the anionic species of dopant ions, in which case the electrolyte has the versatility of being usable for selectively or simultaneously effecting p-type or n-type doping, depending upon the type of electrochemical cell employed and whether the conjugated polymer is used as the anode-active material, the cathode-active material, or both, of the electrochemical cell. Halide, perchlorate, or hexafluorophosphate salts or either an alkali metal or a tetraalkyl ammonium cation are particularly useful examples of this type of ionizable compound. Other types of ionizable compounds, which are ionizable into only one species of dopant ions, are also suitable for use in carrying out the electrochemical doping procedures in accordance with the present invention, in those instances wherein only one type of doping, i.e., either p-type or n-type, is desired.

The ionizable compound, which is used as the active electrolyte material in carrying out the doping procedures in accordance with the present invention, may suitably be employed in the form of a solid, fused solid (i.e., molten salt), or dissolved in a suitable solvent for the ionizable compound which is inert with respect to the electrode materials and which will permit the migration of the dopant ions to the electrode-active materials. Alkali metal halides, such as lithium iodide, are particularly suitable for use as solid electrolytes. Suitable solvents for use in preparing electrolyte solutions include water, methylene chloride, acetonitrile, alcohols (e.g., ethyl alcohol), ethers (e.g., nnonoglynne, diglynne, or solid polyethylene oxide), cyclic ethers (e.g., tetrahydrofuran or dioxane), hexannethylphosphorannide, propylene carbonate, methyl acetate, dioxolane, or the like.

The concentration of the ionizable compound when employed in the form of an electrolyte solution may suitably be within the range of from about 0.01 to about 3.0 molar. The solutions of lower molarity are preferably employed when the doped polymer being prepared is to have a relatively low room temperature electrical conductivity, while the solutions of higher molarity are preferably employed when such doped polymer is to have a relatively high conductivity. Each of the anionic and cationic dopant species set forth above will effect an increase, to varying degrees, in the room temperature electrical conductivity of the starting conjugated polymer. For the widest range in selectivity as to achievable conductivities, the preferred cationic dopant species are tetraalkyl ammonium and alkali metal cations, particularly Lit; and the preferred anionic dopant species are halide ions, $ClO_4^-$, $PF_6^-$, $AsF_6^-$, $AsF_4^-$, $SO_3CF_3^-$, $BF_4^-$.

In addition, any suitable doping procedure may be used to dope the above polymers, including chemical doping and electrochemical doping. In chemical the conductive polymer is contacted with the dopant, which may be either in the vapor phase or in solution, whereby uptake of the dopant into the polymer occurs by chemical reaction and/or charge transfer to a degree proportional with both the dopant concentration and the contacting period, such concentration and contacting period being coordinated and controlled so that the corresponding degree of doping will be such as to provide the resulting doped acetylene polymer with the preselected room temperature electrical conductivity. (See, e.g., U.S. Pat. Nos. 4,222,903 and 4,204,216, the disclosure of each of which are incorporated herein by reference.) Alternatively, an electrochemical doping procedure may be used, such as that described in U.S. Pat. No. 4,321,114, the disclosure of which is incorporated herein by reference. This process involves suspending a polymer-coated, working electrode in an electrolyte solution in which the polymer is insoluble along with separate counter and reference electrodes. An electric potential difference is created between the electrodes that causes a charge and the appropriate counter ion from the electrolyte to enter the polymer in the form of electron addition (i.e., n-doping) or removal. (i.e., p-doping). By tuning the doping level it is possible to change the conductivity of the nanofiber material and, in turn, the electrical properties of the electrode structure from an insulating base form ($\sigma e$ 10-10 S/cm) to a conducting salt form ($\sigma g$ 1 S/cm).

Structured Nanofiber Electrodes

Figure 4A:
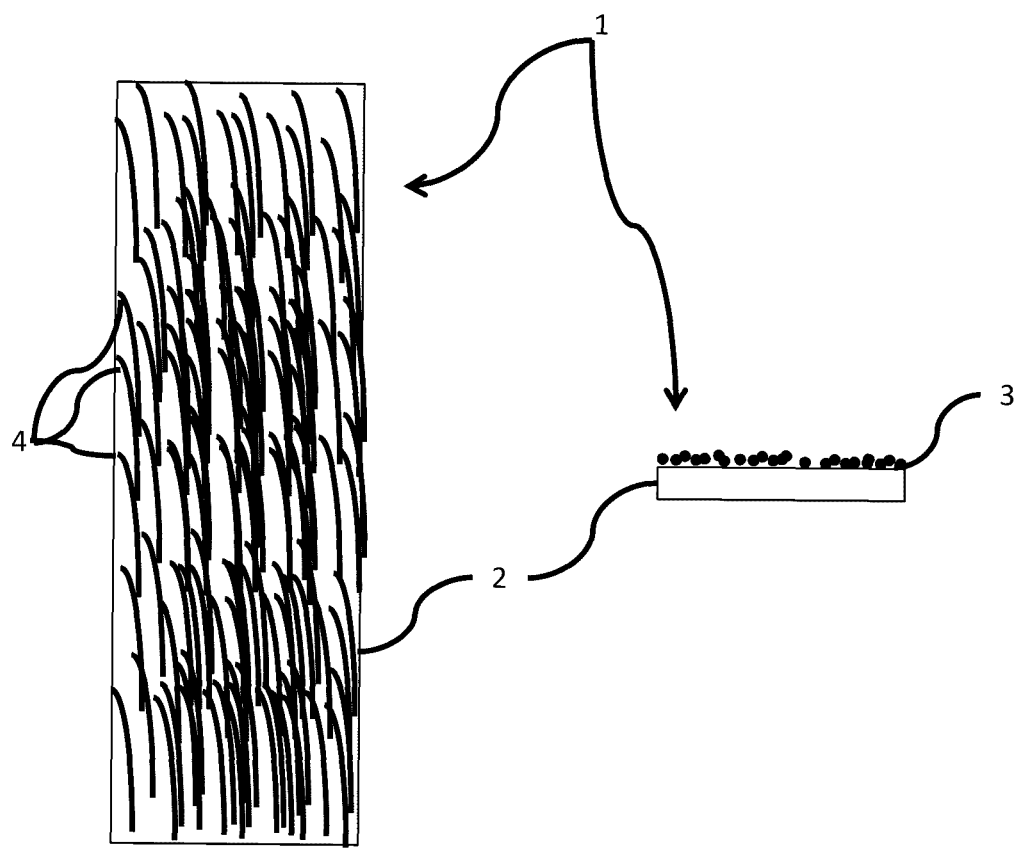
FIG. 4A provides a schematic of a conjugate nanofiber ion storage electrode in accordance with the instant invention.

Turning to the construction of the novel ion storage structured conductive polymer nanofiber electrodes of the current invention, as shown in FIG. 4A consists generally of a substrate (2) onto which a nanofibrillar film (3) of conductive polymer nanofibers (4) has been deposited.

Figure 4B:
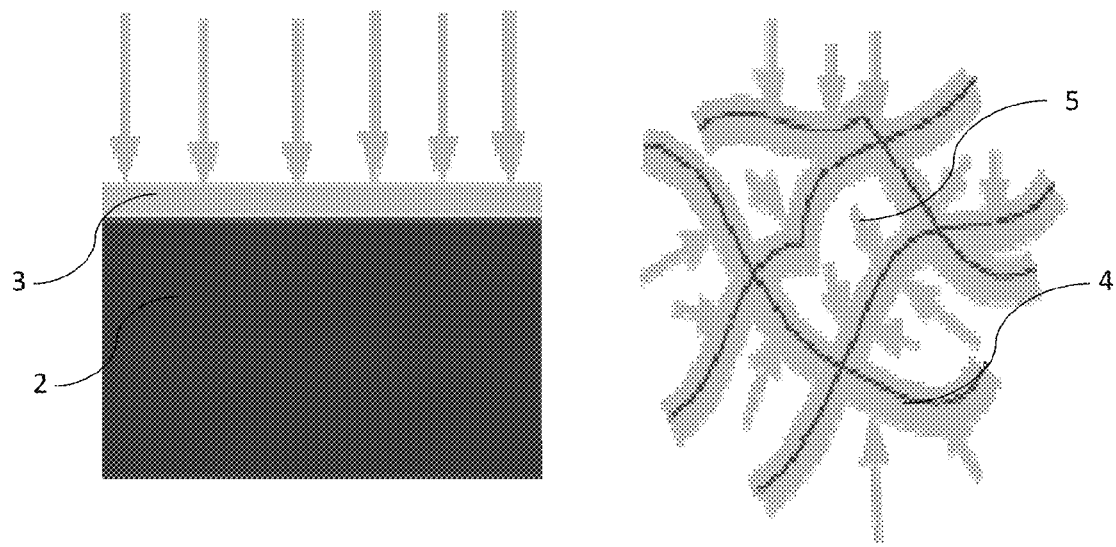
FIG. 4B provides a schematic of a conjugate nanofiber film demonstrating pore size of the film.
Figure 4C:
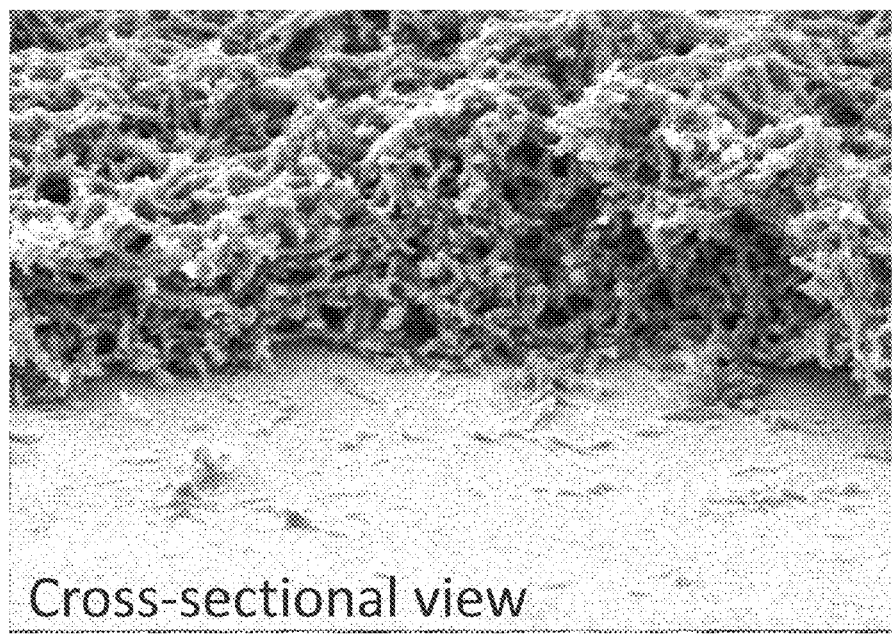
FIG. 4C provides a cross-sectional. SEM of a conjugate nanofiber film.

As previously discussed, since the properties of nanomaterials are highly dependent on their size, shape, and alignment over a macroscopic area, controlling these factors for the nanoscale conducting polymer ion storage electrodes of the instant invention are of great importance. To this end, it is important that the fibers used in electrodes have a high aspect ration and be of a nanoscale size. In the context of this invention the nanofibers should have a diameter of from about 1 to 100 nm and a length of from about 2 to 30 µm. In addition, the nanofibers should be disposed in ordered films that have nanofibrillar morphology wherein polymer aggregates are avoided. In addition, as shown in FIG. 4B, the pore size (5) of the films (3) should be engineered to ensure facile movement of the electrolyte and dopants (shown by arrows) into and out of the nanofibers (4). In one such embodiment, the preferred pore size ranges from 0.2 to 20 nm. FIG. 4C shows a cross-sectional view of an exemplary film with the pores clearly visible in the SEM.

The substrate material may be chosen from any material suitable for forming an electrode made of a material that is electrochemically active with respect to the redox pair to be used, such as, for example, a metal, a conductive glass, a carbon material, or a substrate made of a non-conducting material such as a conventional glass. Some suitable materials include, for example, paper, gold, platinum, tantalum, titanium, nickel, copper, carbon, aluminum, stainless steel, Pyrex, silica, or the like.

Figure 5:
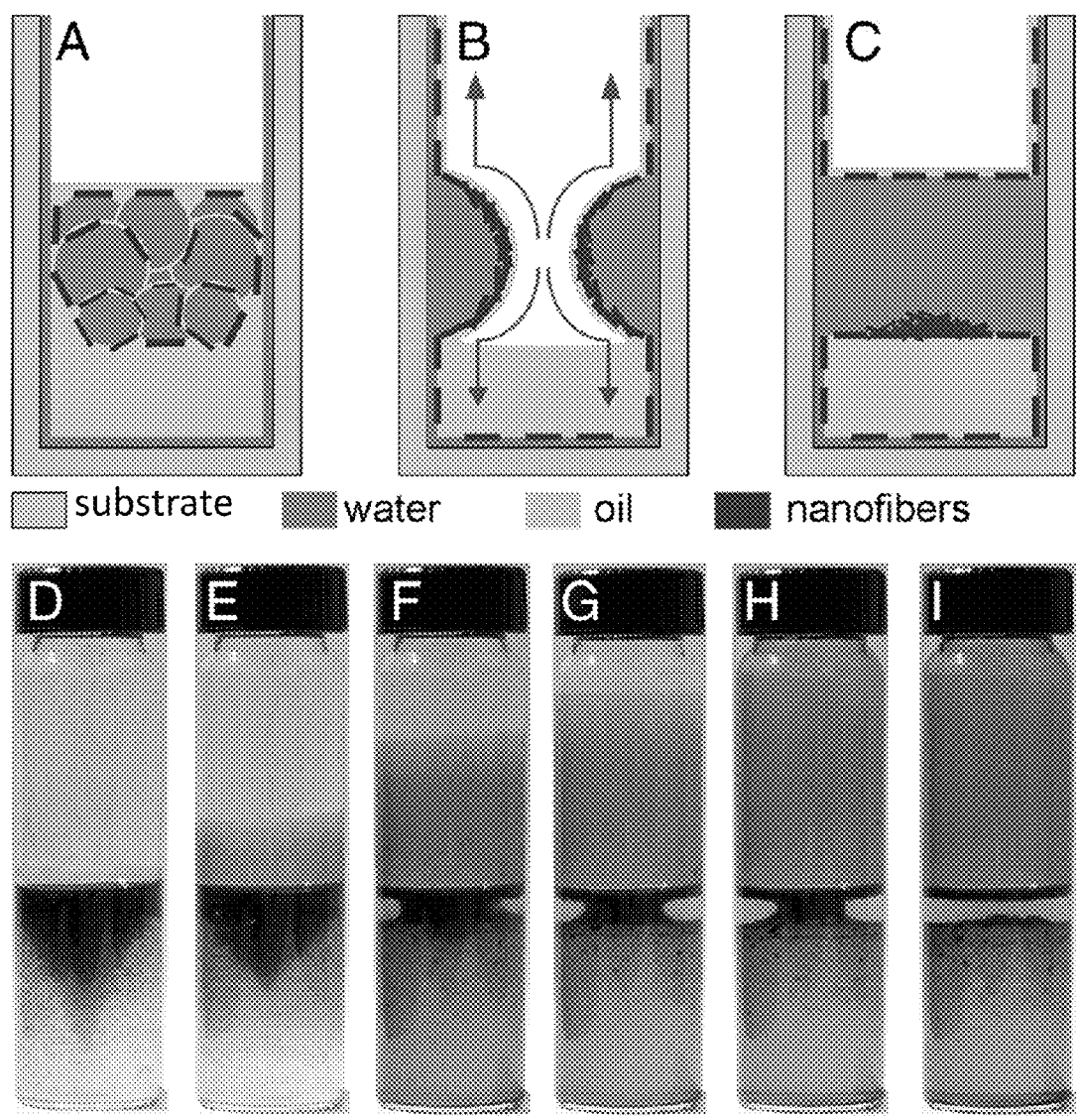
FIGS. 5A to 5I provide schematics and images of a process for forming conjugate nanofiber ion storage electrodes in accordance with the instant invention, where: water, a dense oil, and polymer nanofibers are combined in a glass container and vigorously agitated to form an emulsion, (A) after the container is set down, water droplets dispersed in oil and covered with polymer nanofibers rise to the top of the oil phase, (B) droplet coalescence generates a concentration gradient of interfacially adsorbed nanofibers, a water-shaped catenoid, and directional fluid flow resulting in the spreading of a monolayer of nanofibers up and down the container walls, (C) the catenoid breaks up into two distinct bulk liquid phases: water on top and oil at the bottom, (D)-(I) show images of a film growth sequence: (D) 0, (E) 0.5, (F) 1, (G) 10, (H) 30, and (I) 35 s, and (J) shows an SEM of a polyaniline film grown in accordance with the current invention.

Regardless of the identity of substrate a film comprising at least a monolayer of conjugate polymer nanofibers having a nanofibrillar morphology is deposited thereon. In depositing the nanofibers on the substrate any suitable method may be use. However, in one preferred embodiment, a homogeneous thin film of polymer nanofibers can be grown on virtually any substrate by vigorously mixing water, a dense oil, and polymer nanofibers (FIG. 5). (For a complete discussion of this methodology see, Darcy, J M, et al., *PNAS*, 2010, 102146), 19673-19678, the disclosure of which is incorporated herein by reference.) This emulsification process is partly responsible for film growth. Agitation leads to water coating the hydrophilic walls of the container and to aqueous droplets becoming dispersed in the oil phase (FIGS. 5A, D, and E). Solid particles such as nanofibers can serve as a stabilizer in what is referred to as a Pickering emulsion by lowering the interfacial surface tension between immiscible liquids. (See, e.g., Melle S, et al., *Langmuir*, 2005, 21:2158-2162, the disclosure of which is incorporated herein by reference.) In this process, mixing provides the mechanical energy required for solvating the polymer nanofibers in both liquids, thus trapping the nanofibers at the water-oil interface via an adsorption process that is essentially irreversible. (See, e.g., Mayya K S and Sastry M, *Langmuir*, 1999, 15:1902-1904; Cheng H-L and Velankar S S, *Colloids Surf, A*, 2008, 315:275-284; Binks B P, et al., *Chem. Commun.*, 2006, 33:3531-3533; and Binks B P, et al., *Langmuir*, 2006, 22:4100-4103, the disclosures of each of which are incorporated herein by reference.)

Theoretical studies have determined that the energy required for removing adsorbed particles from any interface is much greater than the energy required for spreading. (See, e.g., Ata S, *Langmuir*, 2008, 24:6085-6091, the disclosure of which is incorporated herein by reference.) Although not be bound by theory, this phenomenon means that if nanofibers are trapped at an interface and experience a gradient in surface energy, spreading occurs. When agitation is stopped, the input of mechanical energy subsides, allowing the water droplets to rise to the top of the oil layer and coalesce. The total interfacial surface area decreases during coalescence, expelling oil and nanofibers out from the droplets, producing a spontaneous concentration gradient of irreversibly adsorbed nanofibers, and thus creating a Marangoni pressure at the water-oil interface. (See, Mayya K S and Sastry M, 1999 and Ata S, 2008, cited above.) An interfacial surface tension gradient arises that pulls expelled nanofibers into areas of higher interfacial surface tension, while a film of nanofibers spreads up and down the container walls as a monolayer squeezed between water and oil. (FIGS. 5B and F to H). Note that there is no film growth on the glass walls that surround the bulk water phase because a water-oil interface is not present (FIGS. 5C and I).

Figure 5J:
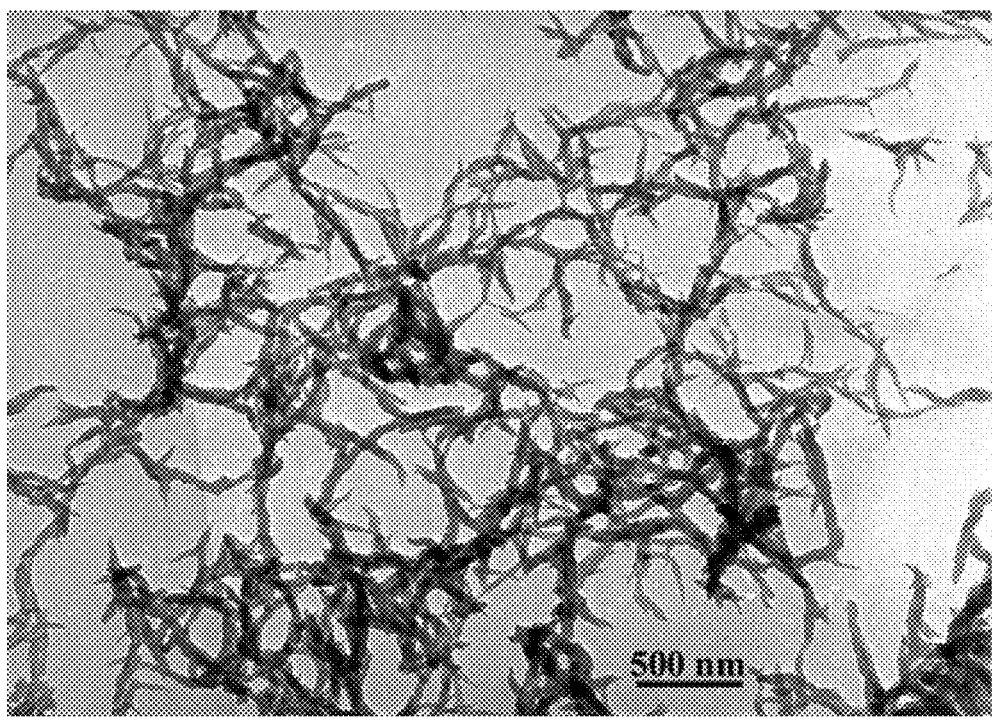

As shown in FIG. 5, during film growth, the water layer assumes the shape of a catenoid with an inner oil channel containing the majority of the nanofibers. Water minimizes its surface free energy by adopting this shape. (See, Lucassen J, et al., *Langmuir*, 1992, 8:3093-3098, the disclosure of which is incorporated herein by reference.) Viscous flow inside the catenoid creates fluid movement both up and down from the thinnest toward the thickest section of the channel. (See, Rey A D, *Macromolecules*, 1997, 30:7582-7587, the disclosure of which is incorporated herein by reference.) Coalescence thins out the inner channel. (FIG. 5F to H) and eventually leads to the catenoid breaking up, terminating viscous flow. Two distinct bulk phases are established, causing the redistribution of nanofibers (FIGS. 5C and I). Water-oil interfaces containing nanofibers are found both adjacent to air and below the bulk water layer. The top interface contains a concentration gradient of nanofibers that continues to drive film growth upward for a few seconds after the catenoid breaks up. This concentration is exploited to fully coat a glass slide as it is pulled out of the solution. The bottom interface contains a polymer reservoir of nanofibers (FIG. 5J) that can be used for the growth of additional films.

Although the above description provides an example of monolayer deposition of nanofibers on a substrate, the nanofibrillar density of the films produced by the Marangoni flow technique described above can be controlled by sequential deposition of layers of doped nanofiber films. In turn, deposited film mass can be controlled by the angle at which the film is grown because the mass of polymer deposited varies inversely with film height. Accordingly, this technique demonstrates the ability to control the film morphology via a concentration gradient. (See, Chengara A, et al., *J Colloid Interface Sci*, 2004, 280:192-201. In addition, varying polymer concentration in the film growth solution changes surface packing of the nanofibers, enabling another method for controlling film morphology. It should also be understood that, the above method may be employed for coating polymer chains. If, for example, the polyaniline nanofibers are dissolved in a solvent such as m-cresol then the water/oil interface can be used for trapping the polymer chains and depositing them on the surface of electrodes.

Finally, to enhance the wetting of a metal surface, the pH of the aqueous solution can be selected. For example, the addition of a base or an acid can lead to improved wetting and thus a more homogeneous film. This is dependent on the metal and polymer used. Accordingly, in one embodiment the pH of the solution is modified between pH 1 to pH 11 as a function of the surface energy of the substrate and the polymer to control the wetting of the surface and improve the morphology of the thin film deposition.

Exemplary Embodiments

The invention is further illustrated by way of the following examples, which are not meant to limit the scope of the invention.

Methods & Materials

Polyaniline Nanofiber Synthesis.

Aniline (0.16 mL, 1.75°—10-3 mol. Sigma-Aldrich®) in 8 mL of 1 M HCl (Solution A), ammonium peroxydisulfate (0.1002 g, 4.39°—$10^{-4}$ mol, Fisher®) in 8 mL of 1 M HCl, and N-phenyl-1,4-phenylenediamine (0.0032 g, 1.74°—$10^{-5}$ mol, Sigma-Aldrich®) in 1 mL of methanol were combined. This polymerization proceeded overnight and was purified via dialysis.

Polyaniline Nanofiber Film Growth.

Typically, a volume ranging between 0.3 and 1.0 mL of an aqueous colloidal dispersion (4 g/L) of partially doped polyaniline nanofibers was mixed with 3 mL of DI water. Then 6 mL of chlorobenzene (or chloroform) was added and shaken vigorously. The substrate, a clean microscope glass slide, was introduced into the container and shaken for 10 s. Polymer film growth started once the container was left motionless. Film adhesion to a substrate increases via temperature annealing at 55° C. for 48 h.

Deposition on Nonactivated Hydrophobic Surfaces.

A plastic polyvinyl chloride slide (7.5° —25 $mm^2$) was coated by using 3 mL of an aqueous dispersion of polymer nanofibers [4 g/L] and 7 mL of a fluorocarbon such as Fluorinert FC-40®. After 1 min of agitation, the substrate was dried under ambient conditions.

Cyclic Voltammetry of Polyaniline Nanofiber Films.

A polyaniline nanofiber film was grown on an ITO-glass substrate and dried for 12 h at 25° C. followed by 48 h at 55° C. A dried, blue-colored film was then immersed in the electrolyte and cycled from −0.2 to −1.2 V and then back to −0.2 V by using a scan rate of 50 mV/s. The CVs collected were reproducible for more than ten cycles. When the films are dried in a vacuum oven at 55° C. for 1 week, nanofiber films are less prone to determination from the surface of ITO after prolonged and repeated cycling.

Example 1

Synthesis of Polymer Nanofiber Material

In one embodiment, polyaniline nanofibers were synthesized by initiator assisted oxidative rapid mixing polymerization for 24 to 48 hrs, and purified either by dialysis, or liquid/liquid extraction. (See, e.g., Tran, H. D., et al., *Advanced Materials* 2009, 21, (14-15), 1487-1499; and Li, D. et al., *Accounts of Chemical Research* 2008, 42, (1), 135-145, the disclosures of which are incorporated herein by reference.) The doping levels of these organic conductors are controlled by the extent of purification; the longer the dialysis, or the more number of washes employed, the more dedoped the polymer nanofibers become. A stable colloidal dispersion of nanofibers is obtained after purification for over a period of one week via repeated dialysis, or by using multiple washes during liquid/liquid extraction. This aqueous dispersion can then be used for coating a substrate such as copper, and aluminum.

Example 2

Preparation of Electrode

A metal surface is cleaned in oxygen plasma, increasing hydrophilic character, and affording the correct surface energy for the spreading and deposition of a nanofiber film. Typically, a metal electrode is cleaned between 30 s to 2 min—note that it is susceptible to degradation from prolonged oxygen plasma (3 min). Aqueous dispersions of nanofibers of polyaniline are mixed with an oil such as a hydrocarbon of heavy (chloroform, carbon disulfide, chlorobenzene), or low (toluene, benzene, hexane) density. A film is produced at the liquid/liquid interface between a binary system of immiscible solvents. An electrode needs to be in contact with the liquid/liquid interface for deposition to occur, and needs to be wet with an aqueous layer prior to polymer deposition. This is achieved by immersion of an electrode in water after treatment with oxygen plasma, and before spreading of film occurs. A film growth solution contains polymer, water, and oil contained in a hydrophilic (glass) or hydrophobic (high density polyethylene, or polypropylene) container for the purpose of shaking by hand. The metal electrode is wrapped around a glass slide and introduced into the polymer solution either before shaking. The volumes of liquids that make up a film growth solution are tailored in order to induce film spreading and deposition onto the substrate's surface. Typically, a much larger aqueous layer is used in a hydrophobic container versus a much smaller organic layer.

Stopping container agitation causes droplet coalescence and leads to spreading of emulsified nanofibers, trapped between oil and water, these one dimensional organic semiconductors coat a substrate in the form of a film. Typically, coating a substrate (75 mm×25 mm) requires between 1-5 mL of water, 4-15 mL of oil, and 0.25-0.5 mL of a 4 mg/mL dispersion of dedoped polyaniline nanofibers. A copper or an aluminum electrode is wrapped around a glass slide to ensure its flatness, and once cleaned, it is then introduced into the film growth solution, shaken by hand, and allowed to stand.

A film deposits because the interfacial surface area decreases due to droplet coalescence, causing the expulsion of nanofibers out of droplets and onto the interface present on the surface of a substrate. Droplet coalescence leads to the spontaneous development of an interfacial surface tension gradient, and directional fluid flow in what is known as the Marangoni effect. Spreading is the result of a thermodynamically downhill process of a system seeking to minimize its total interfacial surface energy. Films collected at the liquid/liquid interface on the surface of a substrate adhere to the hydrophilic surface because nanofibers, coated with oil and water, establish a hydrophobic/hydrophilic boundary for spreading. The phenomena of interfacial spreading is clearly visible in the water layer, and films produced in this phase are subsequently collected for characterization. In order to collect a film, the water layer is topped off with excess water in order to remove a thin oil film present at the surface of the water. Once a film is pulled out of the water layer it is allowed to dry at ambient conditions for a period of 1 week, adhesion increases over time. Annealing of films at 55 C/2 hr ensures stronger adhesion and prevents determination.

Example 3

Electrode Testing

Figure 6A:
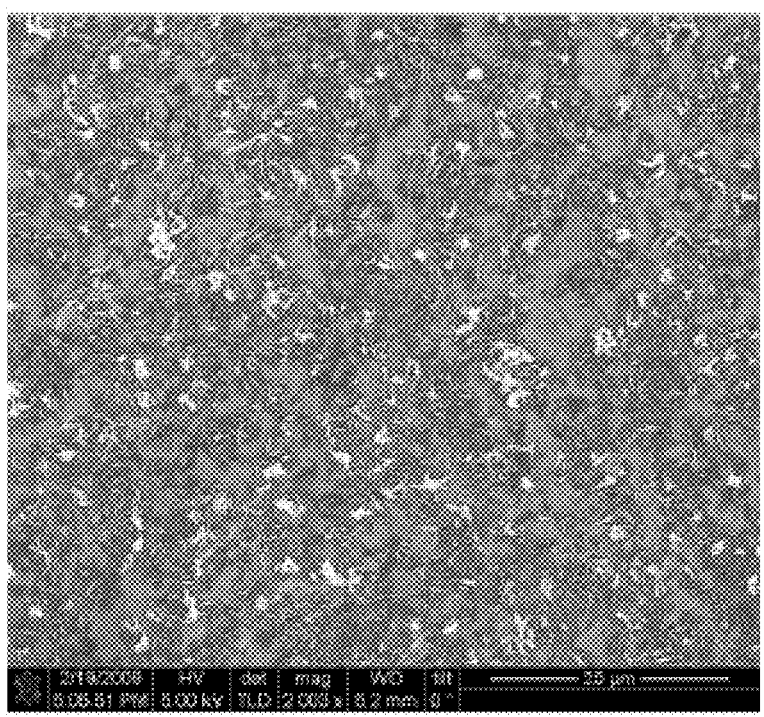
FIGS. 6A and 6B provide SEM images of undoped (3A) and doped (3B) nanofiber films in accordance with the current invention.
Figure 6A:
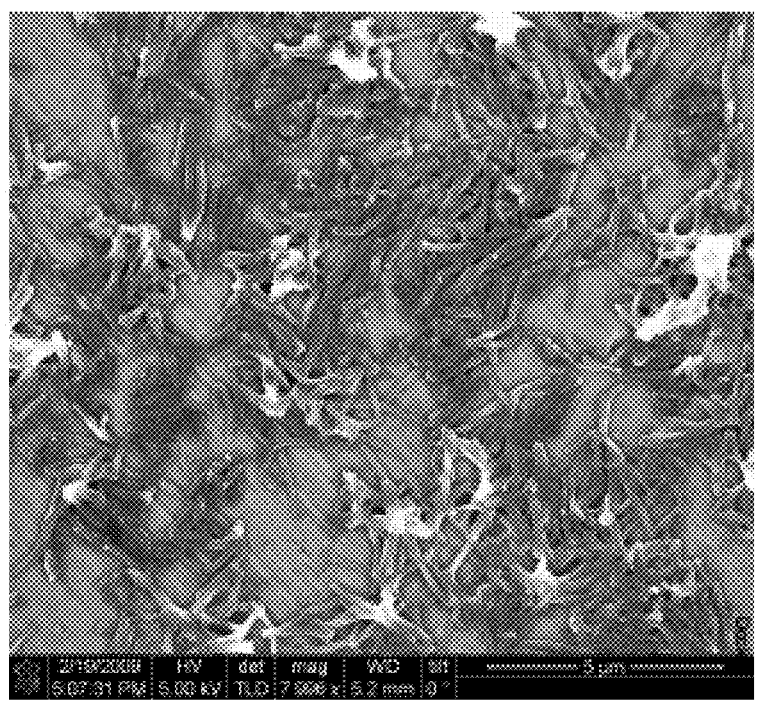
Figure 6B:
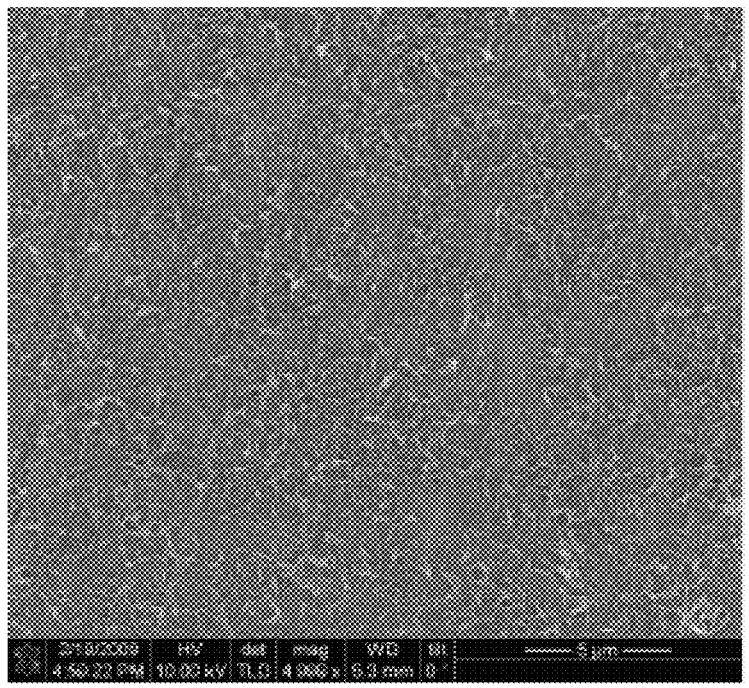
Figure 6B:
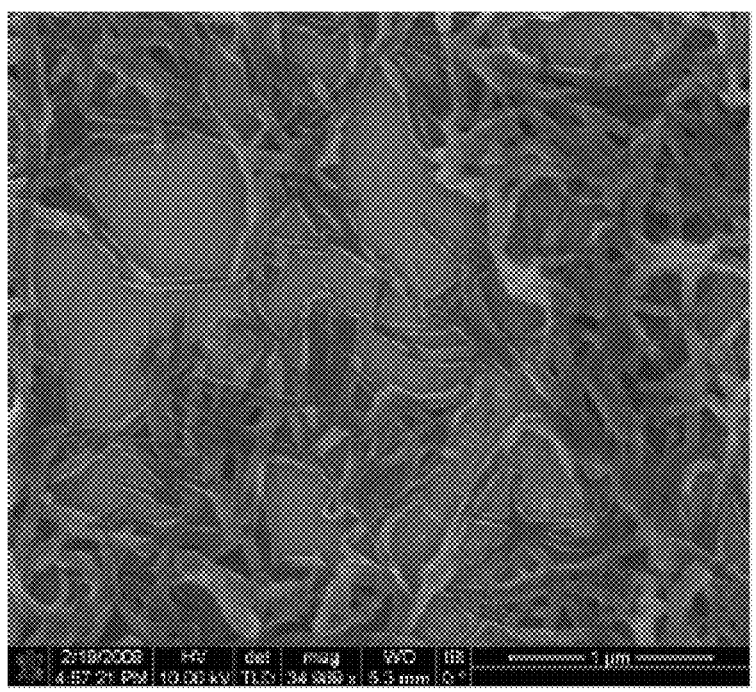

In one embodiment, electrodes (1.5 cm$^2$) are punched from the nanopolyaniline (n-PANI) films on aluminum substrate provided by made in accordance with the processes set forth in Examples 1 and 2, above. In a glove box filled argon with argon, coin cells are assembled with the polymer film as the positive electrode in a lithium hall-cell. The electrolyte is 1 M LiPF$_6$ in EC/DMC in accordance with the structure: (−)Li/1 M LiPF$_6$ in EC/DMC/PANT. SEM images of the undoped (FIG. 6A) and doped (FIG. 6B) electrodes made in accordance with this method show the nanofibrillar morphology of the conjugate polymers used.

Figure 7A:
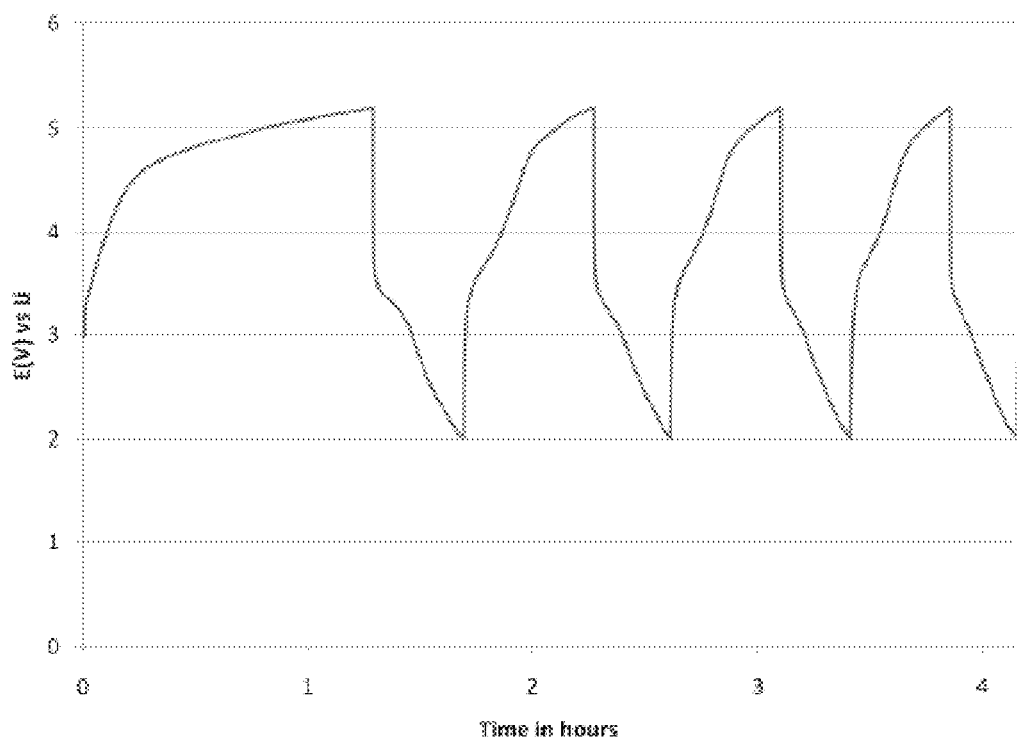
FIGS. 7A and 7B provide data graphs showing cell cycling for anion intercalation.
Figure 7B:
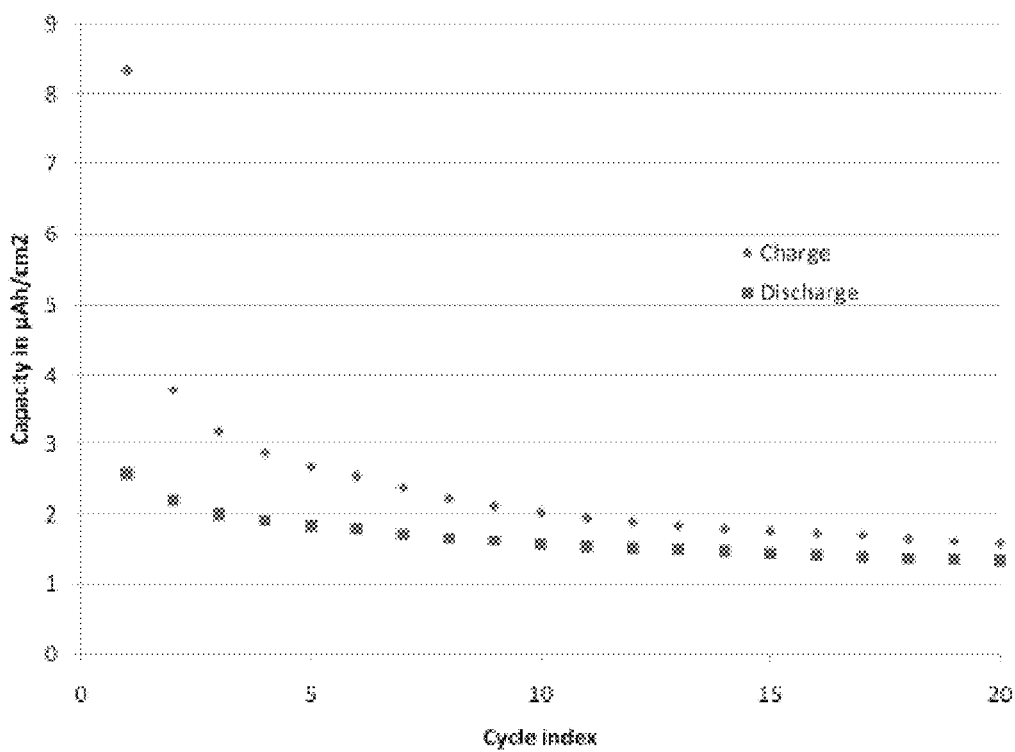
Figure 8A:
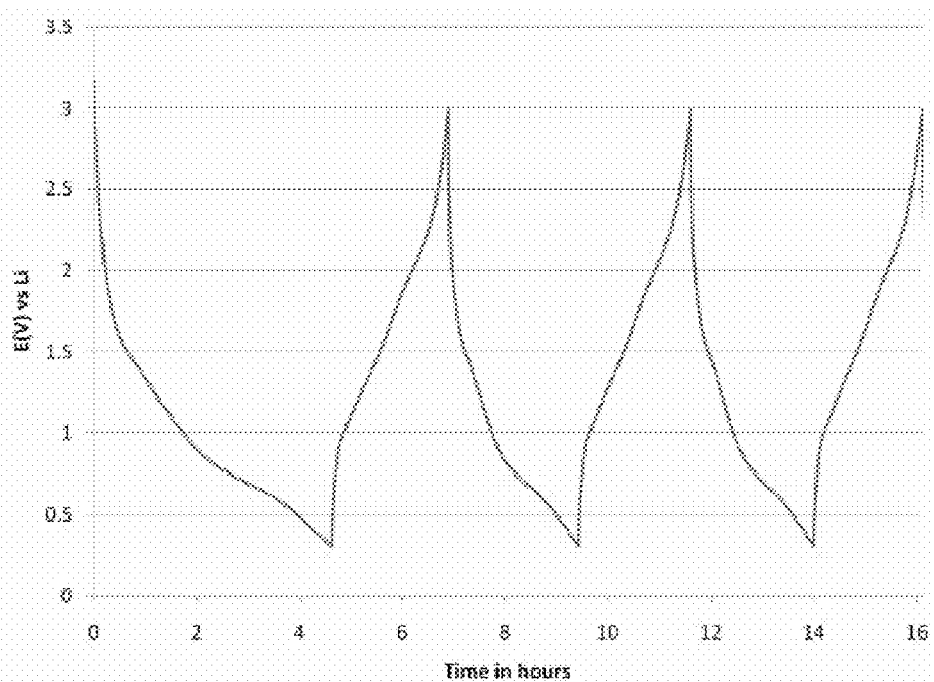
FIGS. 8A and 8B provide data graphs showing cell cycling for cation intercalation.
Figure 8B:
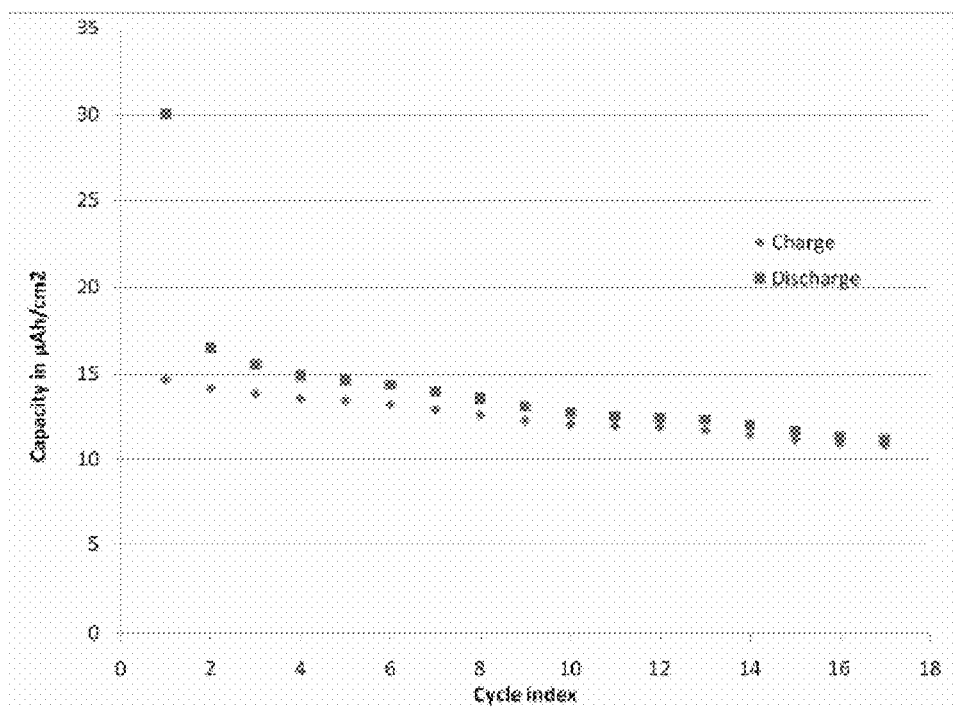

The cells are then cycled at constant current between 2 V and 5.2 V for the anion intercalation (FIGS. 7A & 7B), and between 0.3 V and 3 V for the cation intercalation (FIGS. 8A & 8B). A rough estimate of the polyaniline electrodes capacity (considering a 200 nm thick film, 5% porosity and a density of about 1.2) gives 10 μAh for 1 ion intercalated per structural unit (aniline). The applied current in the following experiments is 10 μA, which means that the film should be intercalated in one hour (if the polymer actually accepts one ion per unit). As a check against artifacts, blank experiments (with aluminum substrate without the polymer film) have been ran to check the background noise (not shown).

SUMMARY

The above examples show that the conjugate polymer nanofiber electrodes of the instant invention were able to cycle at high potential. (anion insertion-deinsertion) and at lower potential. (lithium insertion-deinsertion), and that the capacity obtained is very close to the one expected from an estimate of one ion per (C$_6$H$_4$NH) unit intercalated. Accordingly, it has been shown that in accordance with the instant invention it is possible to make highly efficient ion storage electrodes. As discussed earlier, compared with bulk conducting polymers, the conducting polymer nanostructure electrodes of the instant invention display improved performance in technological applications (J. I. Lee, et al., *Nano Lett.*, 2008, 8, 2315, the disclosure of which is incorporated herein by reference), because of the unique properties arising from their nanoscale size:

(i) high electrical conductivity (X. Y. Zhang, et al., *Chem. Commun.*, 2005, 5328; and X. Y. Zhang and S. K. Manohar, *J. Am. Chem. Soc.*, 2004, 126, 12714, the disclosure of which is incorporated herein by reference);

(ii) large specific surface area (X. Y. Zhang and S. K. Manohar, *J. Am. Chem. Soc.*, 2005, 127, 14156, the disclosure of which is incorporated herein by reference);

(iii) short path lengths for the transport of ions;

(iv) improved cycle life due to better accommodation of the strain caused by electrochemical reaction (L. J. Pan, et al., *Adv. Mater.*, 2007, 19, 461; and Z. Niu, et al., *Nano Lett.*, 2007, Z 3729, the disclosure of which is incorporated herein by reference);

(v) mixed conductive mechanism of both electronic and ionic conductivity, which lowers the interfacial impedance between electrodes and electrolyte; and (vi) light weight and large ratio of specific discharge power to weight.

The incorporation of these materials into and onto electrodes for ion storage provide the potential that these materials can finally be used in a wide-variety of novel, low-cost, and environmentally friendly energy conversion and storage systems, including, rigid and flexible batteries, electrochemical capacitors and supercapacitors. (See, e.g., Y. Berdichevsky and Y. H. Lo, *Adv. Mater.*, 2006, 18, 122; R. Xiao, et al., *J. Am. Chem. Soc.*, 2007, 129, 4483; S. I. Cho, et al., *Chem. Mater.*, 2005, 17, 4564; S. I. Cho, et al., *Adv. Mater.*, 2005, 17, 171; S. I. Cho and S. B. Lee, *Acc. Chem. Res.*, 2008, 41, 699; R. Liu and S. B. Lee, *J. Am. Chem. Soc.*, 2008, 130, 2942; and Y. Guo, et al., *J. Am. Chem. Soc.*, 2008, 130, 9198, the disclosures of each of which are incorporated herein by reference.)

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. An ion storage electrode comprising: a substrate having a nanofibrillar film with a thickness of at least one monolayer disposed thereon, the film being formed from a plurality of doped amphoteric conjugate polymer nanofibers, wherein the polymer nanofibers have a diameter of from 1 to 100 nm and a length of from 2 to 30 µm, wherein the film of nanofibers is substantially free from polymer aggregates, and wherein the film of nanofibers is disposed on the substrate such that the polymer nanofibers are oriented substantially parallel to the substrate surface.

2. The ion storage electrode of claim 1, wherein the film has a pore size sufficient to allow a dopant access to the nanofibers of the film from 0.2 to 20 nm.

3. The ion storage electrode of claim 1, wherein the polymer nanofibers are selected from the group consisting of aromatic cycle polymers, double bond polymers, and polymers that include both aromatic cycles and double bonds.

4. The ion storage electrode of claim 3, wherein the polymer nanofibers are selected from the group consisting of polyfluorenes, polypyrenes, polyazulenes, polynaphthalenes, polypyrroles, polycarbazoles, polyindoles, polyazepines, polyanilines, polythiophenes, poly(p-phenylene sulfides), polyacetylenes, polyparaphenylenes, and poly(p-phenylene vinylenes).

5. The ion storage electrode of claim 1, wherein the polymer nanofiber is modified by a particle irradiation technique selected from the group consisting of X-ray, gamma, neutron and electron irradiation.

6. The ion storage electrode of claim 1, wherein the polymer is one of either self-doped or pre-doped.

7. The ion storage electrode of claim 1, wherein the film comprises multilayers of conjugate polymer nanofibers.

8. The ion storage electrode of claim 1, wherein the substrate is selected form the group consisting of a metal, a conductive glass, a carbon material, or a non-conducting material.

9. The ion storage electrode of claim 8, wherein the substrate is selected from the group consisting of paper, gold, platinum, copper, nickel, titanium, tantalum, carbon, aluminum, stainless steel, plastic, Pyrex, and silica.

10. The ion storage electrode of claim 1, wherein the nanofibers are made in accordance with a process selected from the group consisting insoluble hard templates, soluble soft templates, self-assembly external, nanowire seeding, and templateless processes.

11. The ion storage electrode of claim 1, wherein the nanofibers are doped with an anionic dopant selected from the group consisting of $I^-$, $Br^-$, $Cl^-$, $F^-$, $ClO_4^-$, $PF_6^-$, $AsF_6^-$, $AsF_4^-$, $SO_3CF_3^-$, $BE_4^-$, $BCl_4^-$, $NO_3^-$, $POF_4^-$, $CN^-$, $SiF_5^-$, $CH_3CO_2^-$, $C_6H_5CO_2^-$, $CH_3C_6H_4SO_3^-$, $C_{10}H_{15}SO_4^-$, $SiF_6^-$, and $SO_4^-$.

12. The ion storage electrode of claim 1, wherein the nanofibers are doped with a cationic dopant selected from the group consisting of Cs, Rb, K, Na, Ba, Li, Sr, Ca, Mg, Y, Sc, Be, Al, Zr, Ti, and organic cations.

13. The ion storage electrode of claim 12, wherein the organic cations are selected from the group consisting of tetraalkyl ammonium, tetraalkyl phosphonium, tetraalkyl arsonium, trialkyl oxonium, and trialkyl sulfonium.

14. The ion storage electrode of claim 1, wherein the film is deposited on the substrate by a Marangoni flow technique.

15. An electrochemical device comprising at least one ion storage electrode itself comprising:
a substrate having a nanofibrillar film with a thickness of at least one monolayer disposed thereon, the film being formed from a plurality of doped amphoteric conjugate polymer nanofibers, wherein the polymer nanofibers have a diameter of from 1 to 100 nm and a length of from 2 to 30 µm, wherein the film of nanofibers is substantially free from polymer aggregates, and wherein the film of nanofibers is disposed on the substrate such that the polymer nanofibers are oriented substantially parallel to the substrate surface.

16. The electrochemical device of claim 15, where the device is selected from the group consisting of a flexible battery, a rigid battery, a capacitor and a super capacitor.

* * * * *